United States Patent
Chao

(10) Patent No.: US 11,920,727 B2
(45) Date of Patent: Mar. 5, 2024

(54) DEPLOYABLE LIGHT FOR ELECTRONIC DEVICES

(71) Applicant: Vitec Imaging Solutions Spa, Cassola (IT)

(72) Inventor: Hen-Li Philip Chao, Livingston, NJ (US)

(73) Assignee: Videndum Media Solutions SPA, Cassola (IT)

( * ) Notice: Subject to any disclaimer, the term of this patent is extended or adjusted under 35 U.S.C. 154(b) by 107 days.

(21) Appl. No.: 17/576,942

(22) Filed: Jan. 15, 2022

(65) Prior Publication Data

US 2022/0316689 A1    Oct. 6, 2022

Related U.S. Application Data

(60) Provisional application No. 63/177,967, filed on Apr. 22, 2021, provisional application No. 63/138,399, filed on Jan. 16, 2021.

(51) Int. Cl.

| F16M 13/02 | (2006.01) |
| F16B 1/00 | (2006.01) |
| F21S 9/02 | (2006.01) |
| F21V 21/096 | (2006.01) |
| F21V 21/26 | (2006.01) |
| H04M 1/04 | (2006.01) |

(52) U.S. Cl.
CPC .............. *F16M 13/022* (2013.01); *F16B 1/00* (2013.01); *F21S 9/02* (2013.01); *F21V 21/096* (2013.01); *F21V 21/26* (2013.01); *H04M 1/04* (2013.01); *F16B 2200/83* (2023.08)

(58) Field of Classification Search
CPC .......... F21S 9/02; F21V 21/096; F21V 21/26; F16M 13/022; F16B 2200/83; F16B 1/00
See application file for complete search history.

(56) References Cited

U.S. PATENT DOCUMENTS

| 4,506,317 | A | * | 3/1985 | Duddy | ............... F21V 21/0965 362/426 |
| 5,577,697 | A | * | 11/1996 | Accordino | ............ F21V 21/145 248/316.7 |
| 5,921,658 | A | | 7/1999 | Kovacik | |
| 2006/0102818 | A1 | | 5/2006 | Carnevali | |
| 2016/0209733 | A1 | * | 7/2016 | Akai | ................... F16M 11/041 |

FOREIGN PATENT DOCUMENTS

| CN | 205510160 U | 8/2016 |
| CN | 107176108 A | 9/2017 |
| CN | 206664466 U | 11/2017 |
| CN | 209845045 | 12/2019 |

* cited by examiner

*Primary Examiner* — Thomas M Sember
(74) *Attorney, Agent, or Firm* — Michael A. Guth

(57) ABSTRACT

A deployable light for an electronic device, such as a cellular telephone, that attaches to the electronic device with a magnetic connector. The deployable light is adapted to deploy from a stowed position wherein the light may shine in a first direction, to a deployed position wherein the light may shine opposite the first direction. The deployable light may include a magnetic connection portion for attachment to a cellular telephone. The deployable light may provide light when the telephone is using either its forward facing camera or it rearward facing camera.

14 Claims, 59 Drawing Sheets

DEPLOYABLE LIGHT FOR ELECTRONIC DEVICES

CROSS-REFERENCE TO RELATED APPLICATIONS

This application claims the benefit of U.S. Provisional Application No. 63/138,399 to Chao, filed Jan. 16, 2021, which is hereby incorporated by reference in its entirety. This application claims the benefit of U.S. Provisional Application No. 63/177,967 to Chao, filed Apr. 22, 2021, which is hereby incorporated by reference in its entirety.

BACKGROUND

Field of the Invention

The present invention relates to accessories for an electronic device, and more particularly to a magnetic attachment for attaching and/or using the device.

Description of Related Art

Cellular telephones are increasingly used to support video conferencing and other video activities. Also, users may want to be able to support other accessory items, and may want to have them attached to the telephone, or to its case.

What is called for is a device which can provide a more secure way to hold the device, such as a cellular telephone, and which can support accessories.

invention.

Figure 16:
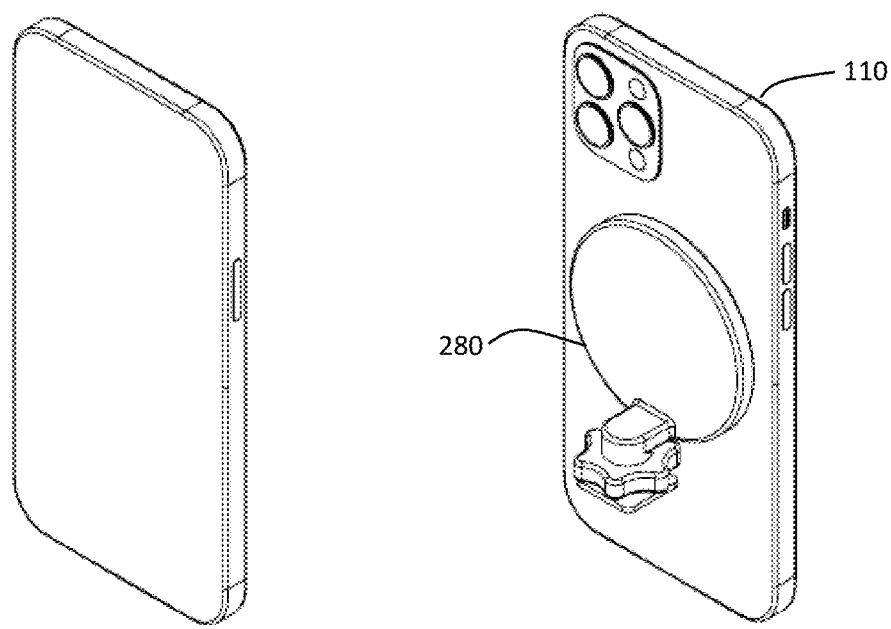

FIG. 16 presents oblique views of a magnetic connector with cold shoe mount on a cell phone according to some embodiments of the present invention.

Figure 17:
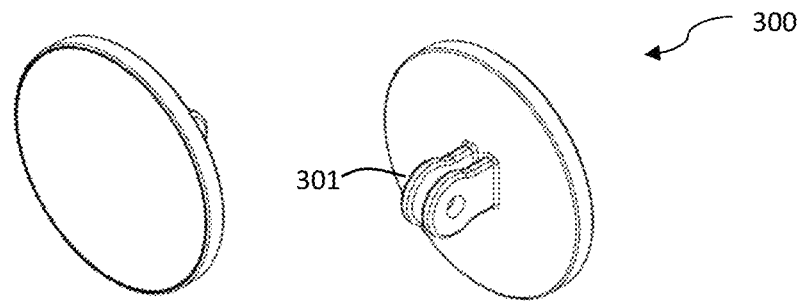

FIG. 17 presents oblique views of a magnetic connector with a parallel plate mount according to some embodiments of the present invention.

Figure 18:
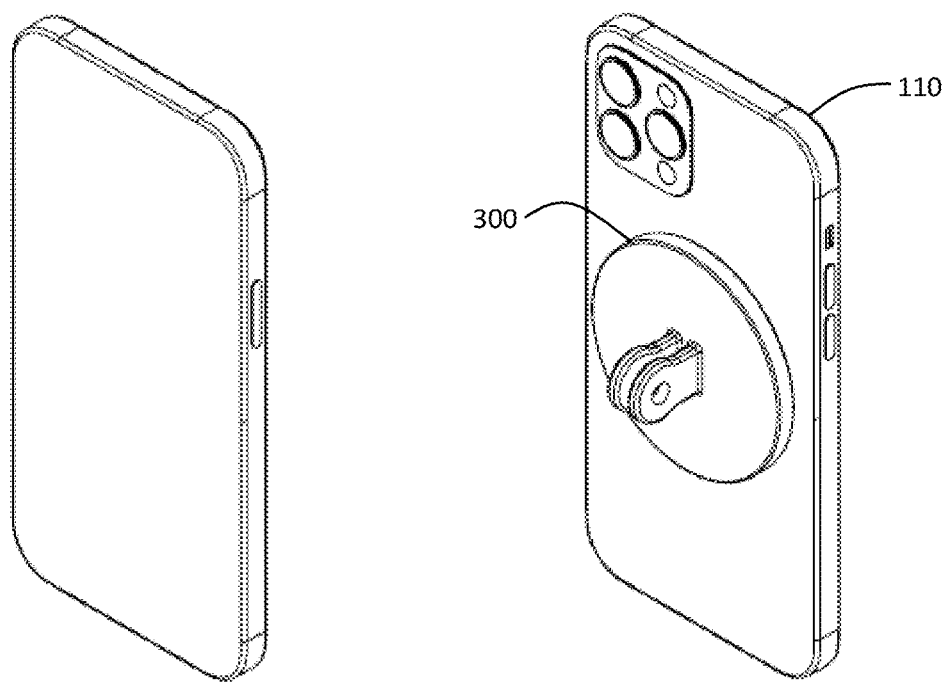

FIG. 18 presents oblique views of a magnetic connector with a parallel plate mount on a cell phone according to some embodiments of the present invention.

Figure 19A:
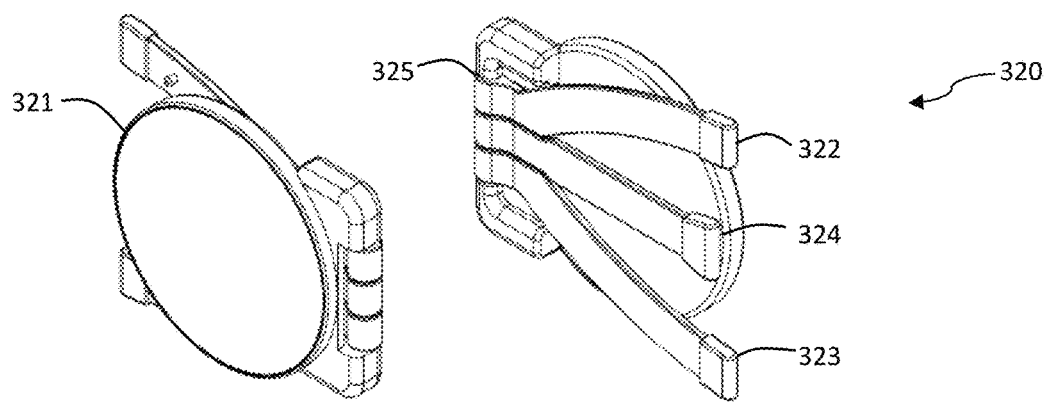
Figure 19B:
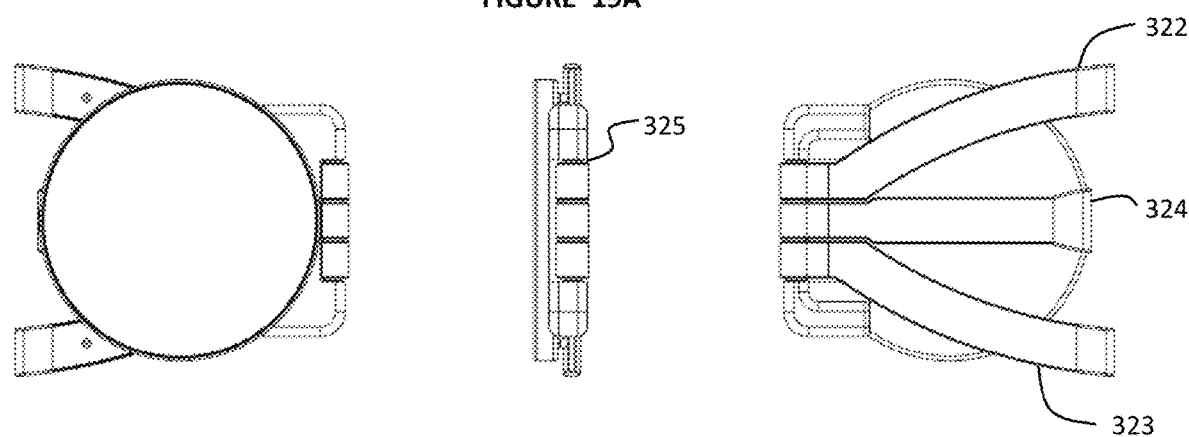
Figure 19C:
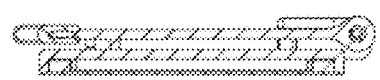
Figure 19C:
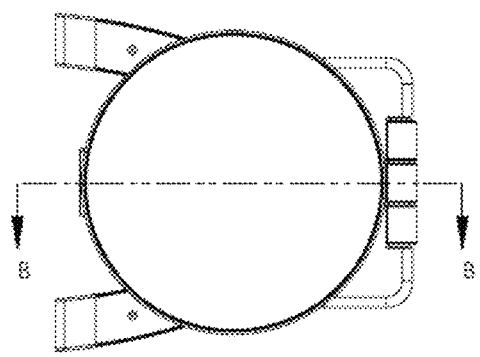

FIG. 19A-19C present views of a magnetic connector with legs according to some embodiments of the present invention.

Figure 20:
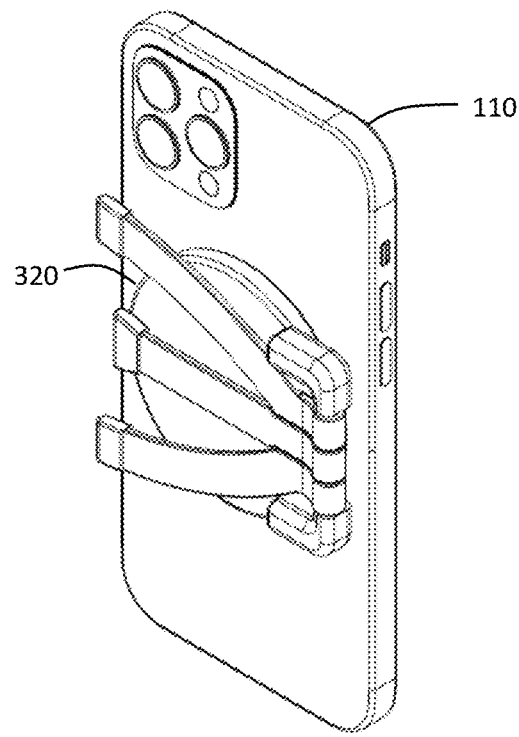

FIG. 20 is an oblique view of a magnetic connector with legs in a stowed configuration on a cell phone according to some embodiments of the present invention.

Figure 21A:
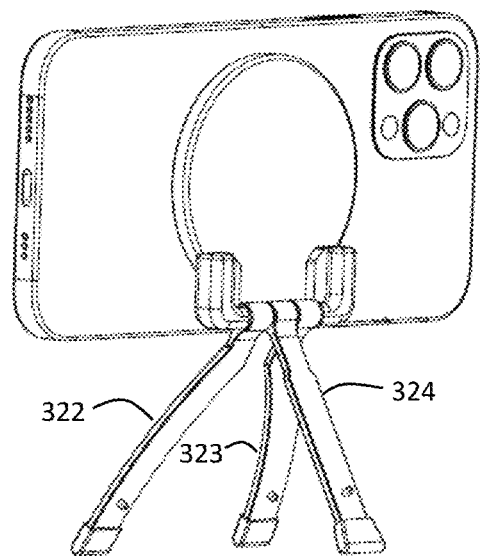
Figure 21B:
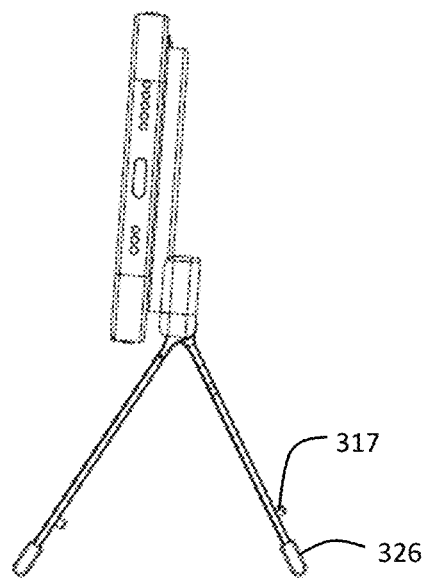

FIGS. 21A-21B are views of a magnetic connector with legs in a deployed configuration on a cell phone according to some embodiments of the present invention.

Figure 22A:
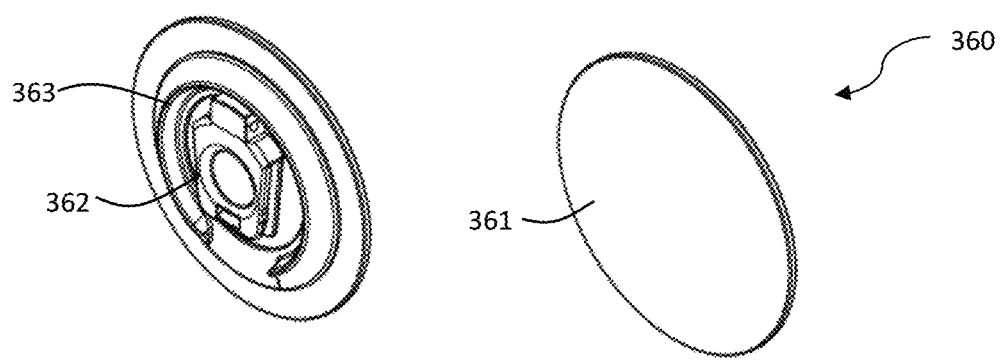
Figure 22B:
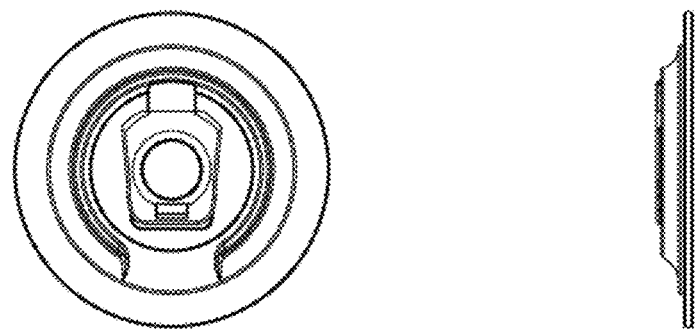

FIGS. 22A-22B present views of a clip support with magnetic connector according to some embodiments of the present invention.

Figure 23:
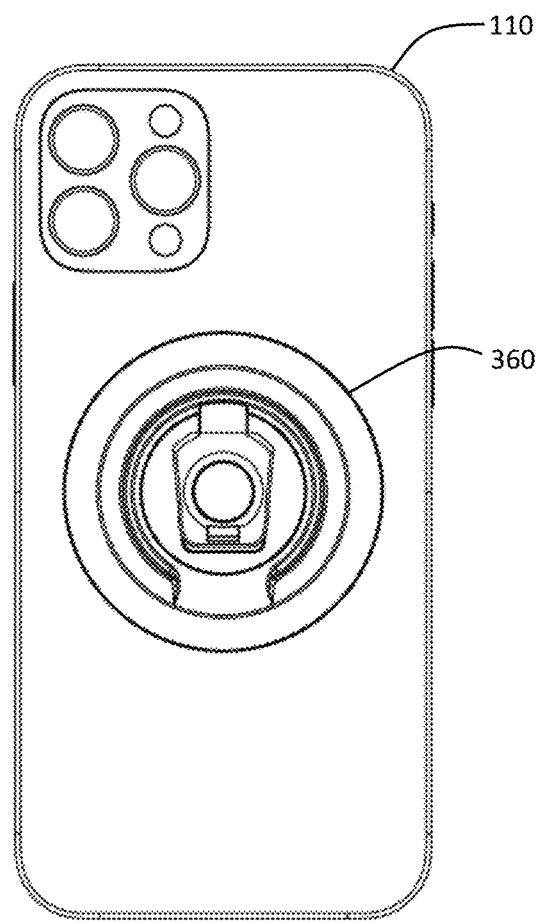

FIG. 23 is a view of a clip support with magnetic connector on a cell phone according to some embodiments of the present invention.

Figure 24A:
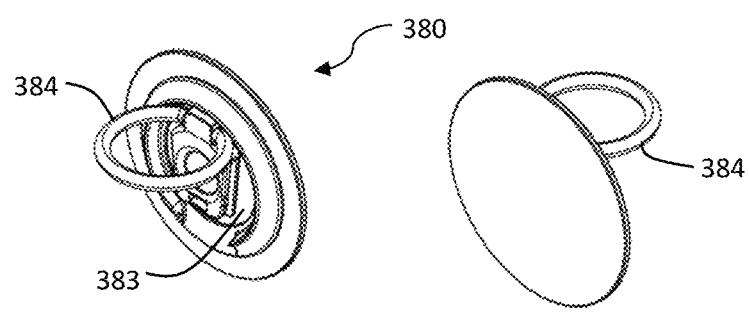
Figure 24B:
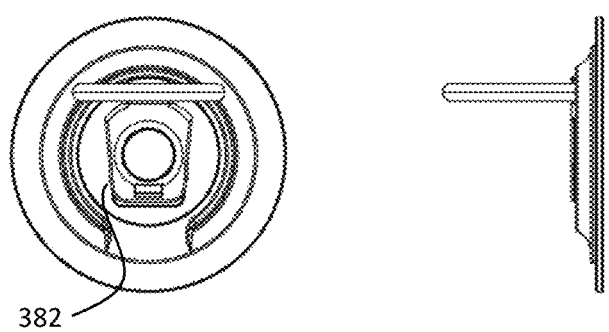

FIGS. 24A-24B present views of a clip support with ring and magnetic connector according to some embodiments of the present invention.

Figure 25:
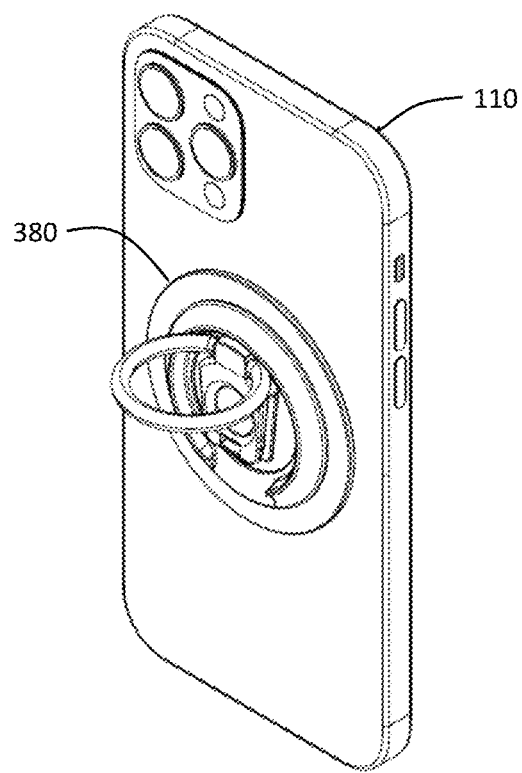

FIG. 25 is a view of a clip support with ring and magnetic connector on a cell phone according to some embodiments of the present invention.

FIGS. 26A-26F are views of a support with magnetic connector and arms in a flat configuration according to some embodiments of the present invention.

Figure 27A:
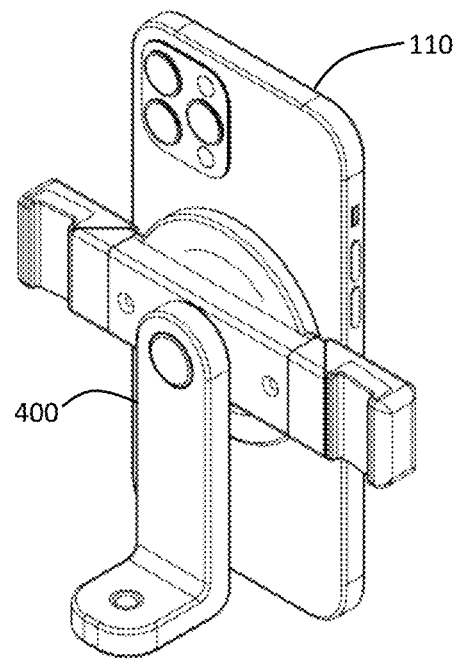
Figure 27B:
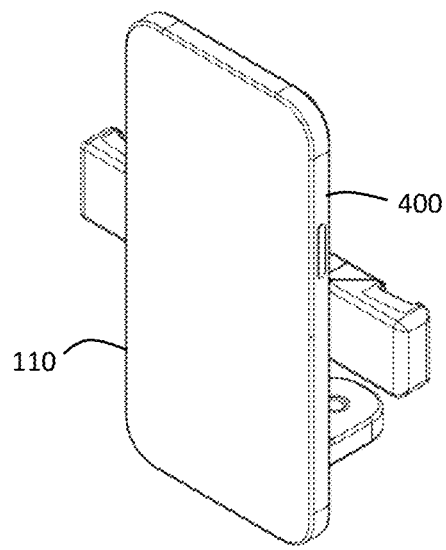

FIGS. 27A-B are views of a support with magnetic connector and arms in a flat configuration with cell phone according to some embodiments of the present invention.

Figure 28A:
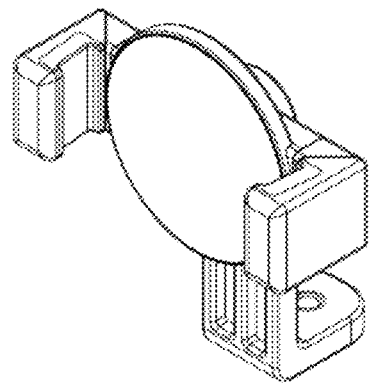
Figure 28B:
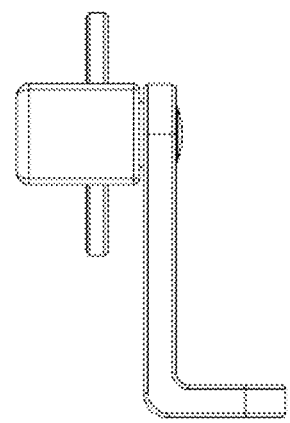

FIGS. 28A-28B are views of a support with magnetic connector and arms in a gripping configuration according to some embodiments of the present invention.

Figure 29A:
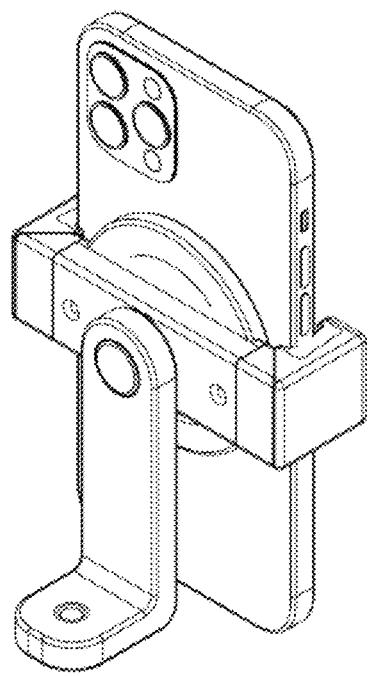
Figure 29B:
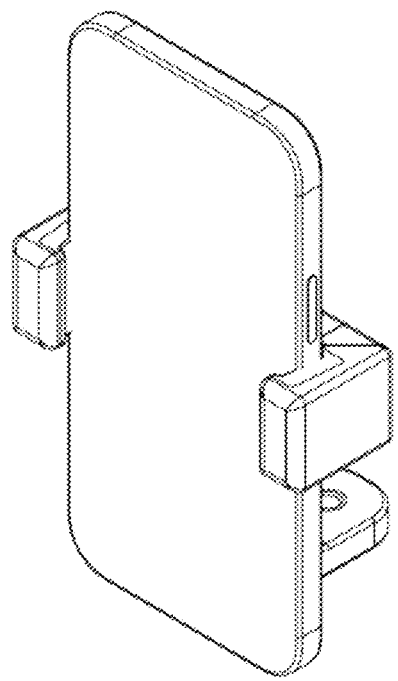

FIGS. 29A-29B are views of a support with magnetic connector and arms in a gripping configuration with a cell phone according to some embodiments of the present invention.

Figure 30A:
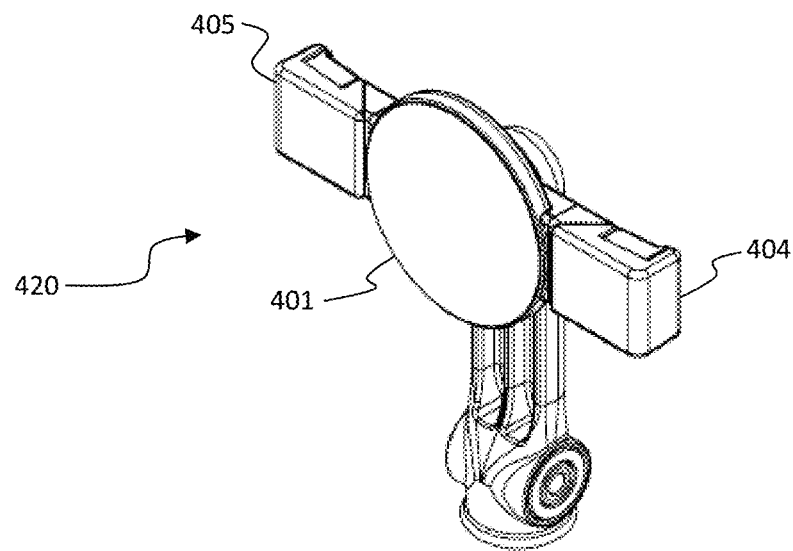

FIGS. 30A-30AA are views of a second embodiment of a magnetic gripping clip according to some embodiments of the present invention.

Figure 31A:
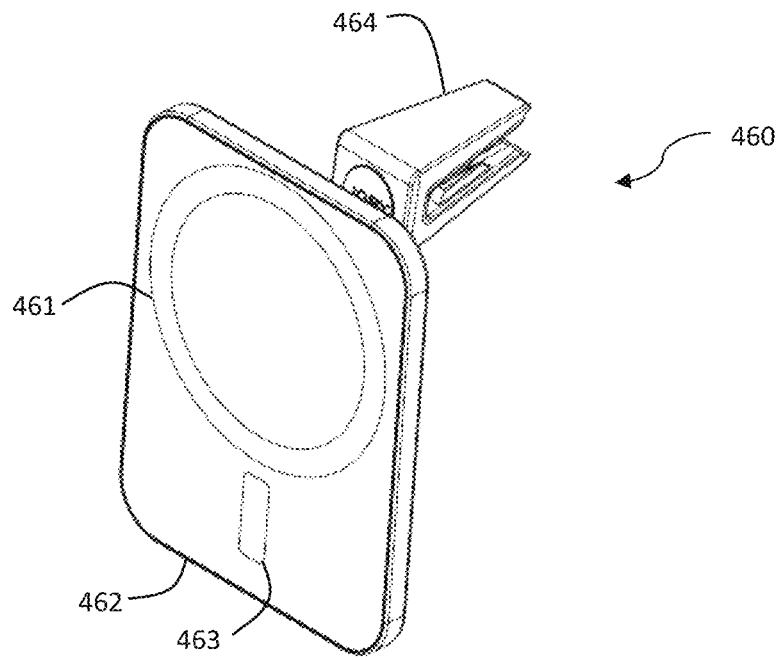
Figure 31B:
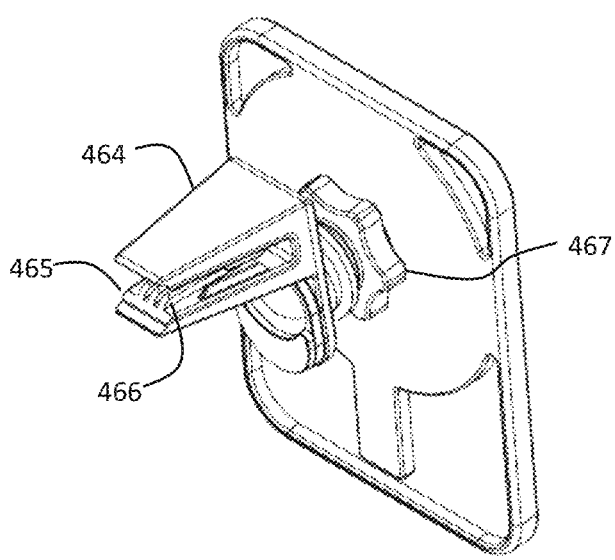
Figure 31C:
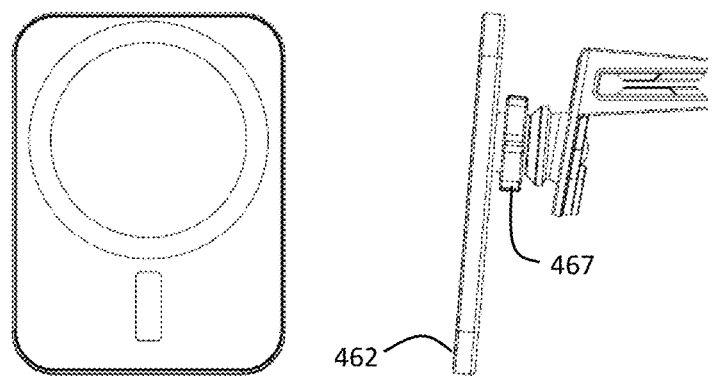

FIGS. 31A-31C are views of a support with magnetic connector and vent clip according to some embodiments of the present invention.

Figure 32A:
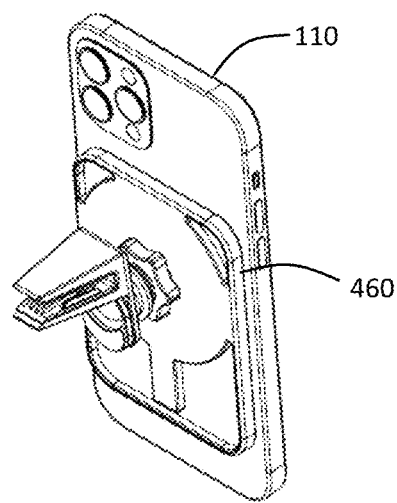
Figure 32B:
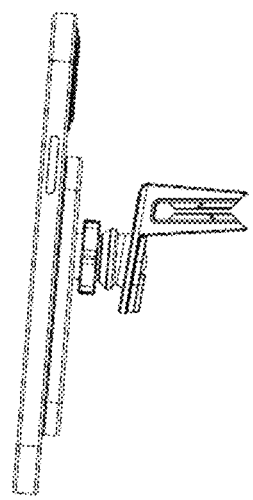

FIGS. 32A-32B are views of a support with magnetic connector and vent clip and cell phone according to some embodiments of the present invention.

Figure 33A:
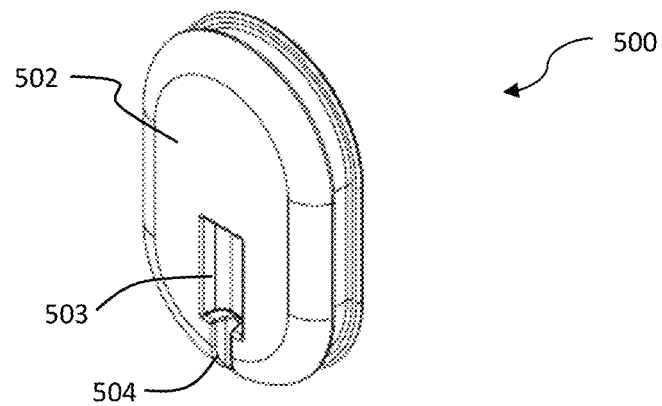
Figure 33B:
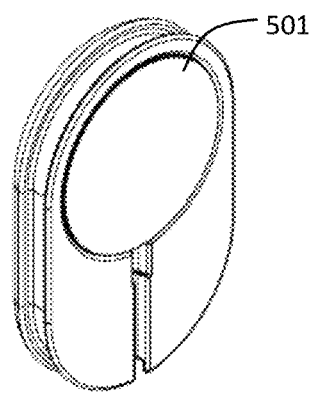
Figure 33C:
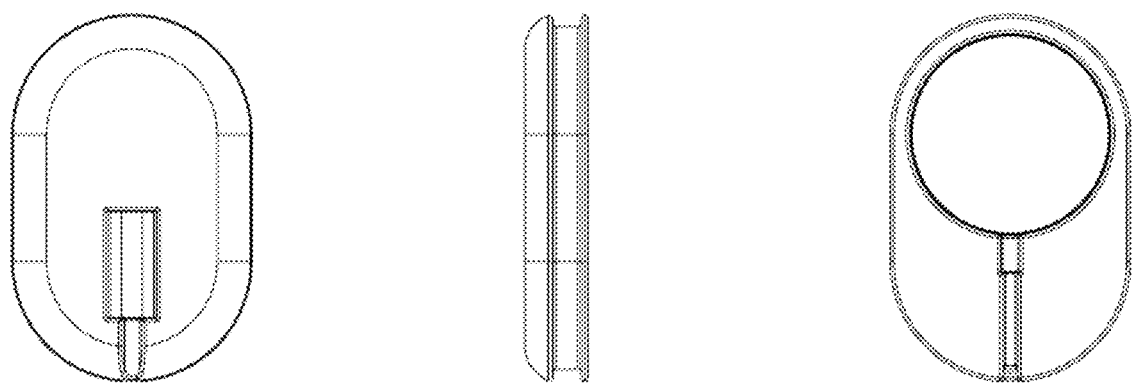

FIGS. 33A-33C are views of an auxiliary battery with magnetic connector and vent clip according to some embodiments of the present invention.

Figure 34A:
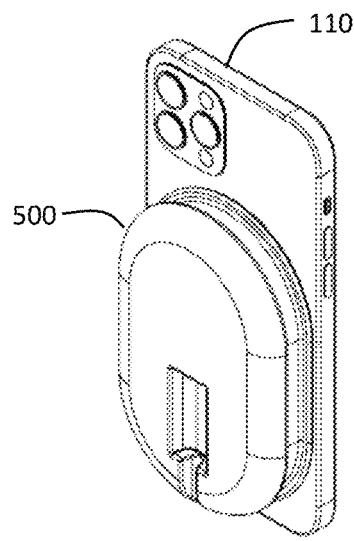
Figure 34B:
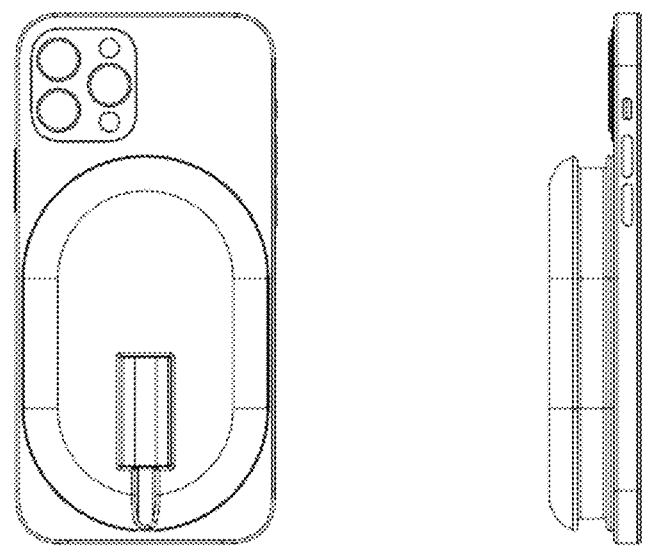

FIGS. 34A-34B are views of an auxiliary battery with magnetic connector and vent clip on a cell phone according to some embodiments of the present invention.

Figure 35A:
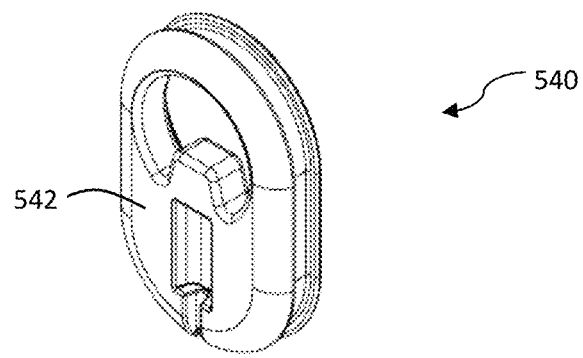
Figure 35B:
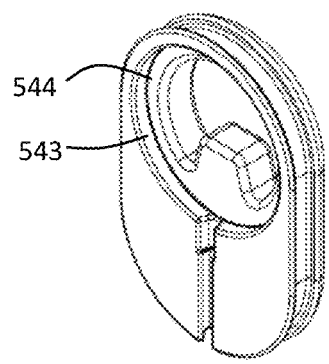
Figure 35C:
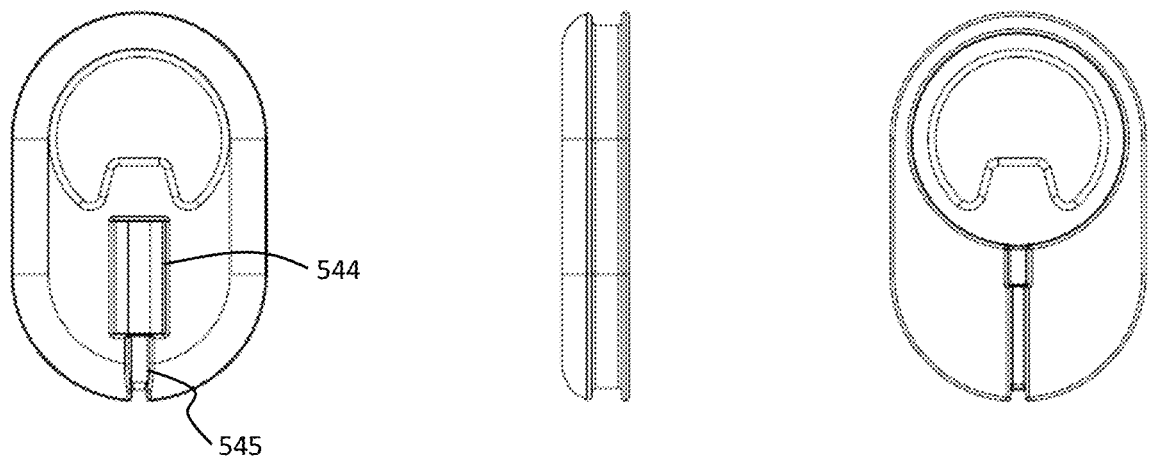

FIGS. 35A-C are views of an auxiliary battery and battery holder with magnetic connector and vent clip according to some embodiments of the present invention.

Figure 36:
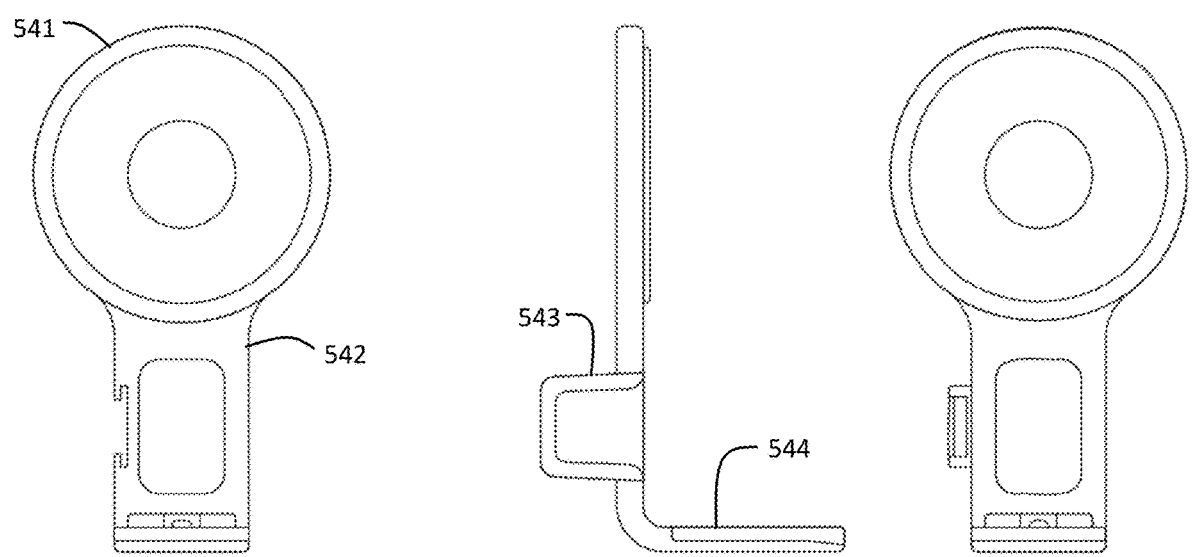

FIG. 36 presents orthogonal views of a clip support with cold shoes and magnetic connector according to some embodiments of the present invention.

Figure 37A:
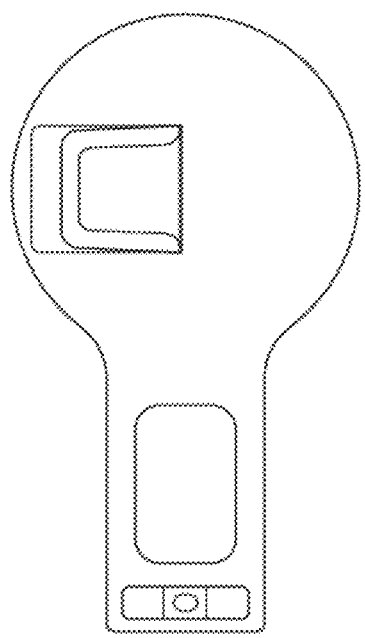
Figure 37B:
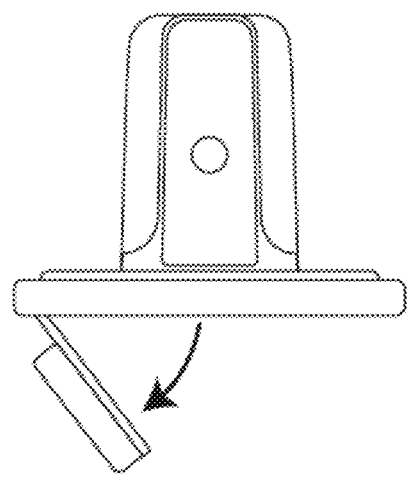

FIG. 37A-37B are views of a clip support with a deployable cold shoe and magnetic connector according to some embodiments of the present invention.

Figure 38A:
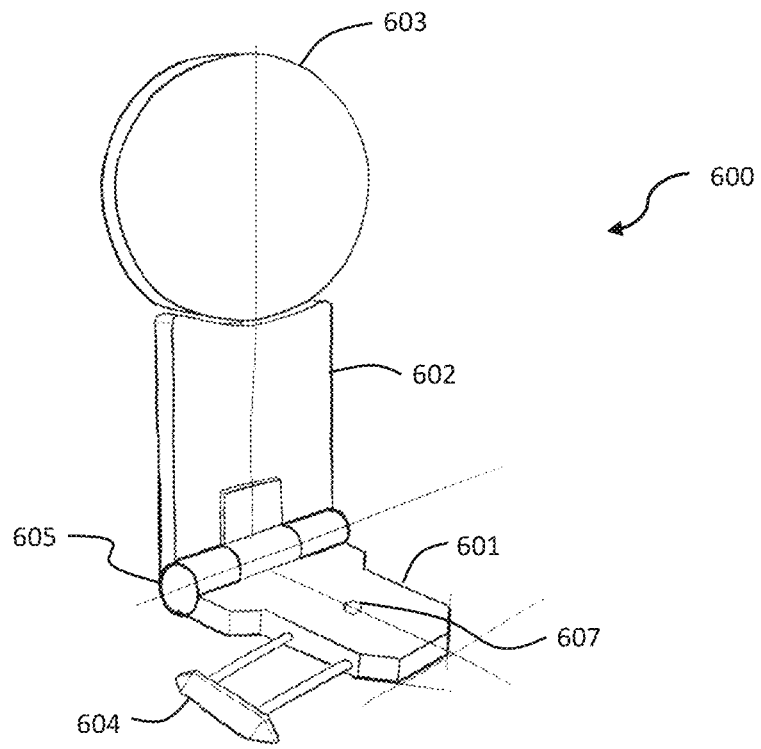
Figure 38B:
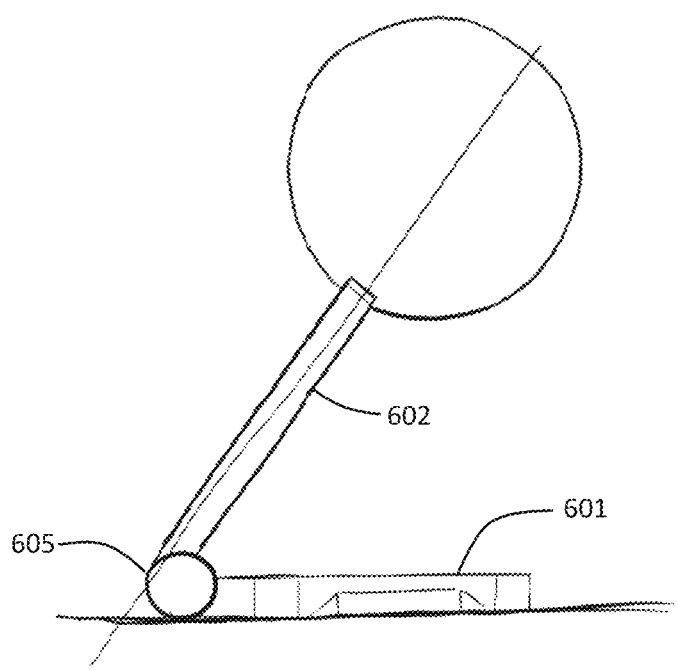
Figure 38C:
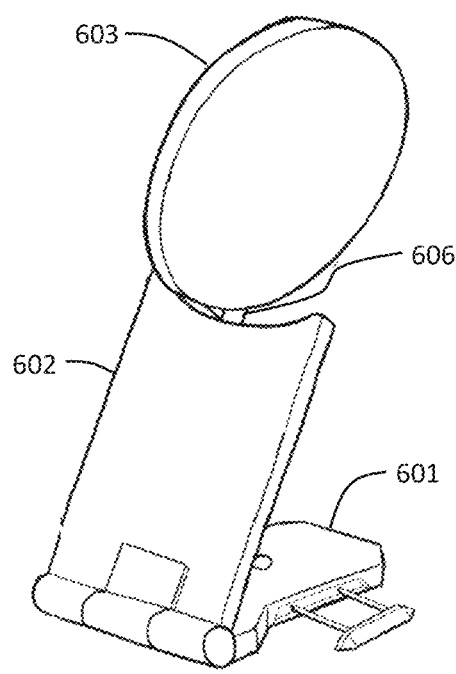

FIG. 38A-38C are views of a device support with magnetic connector according to some embodiments of the present invention.

Figure 39A:
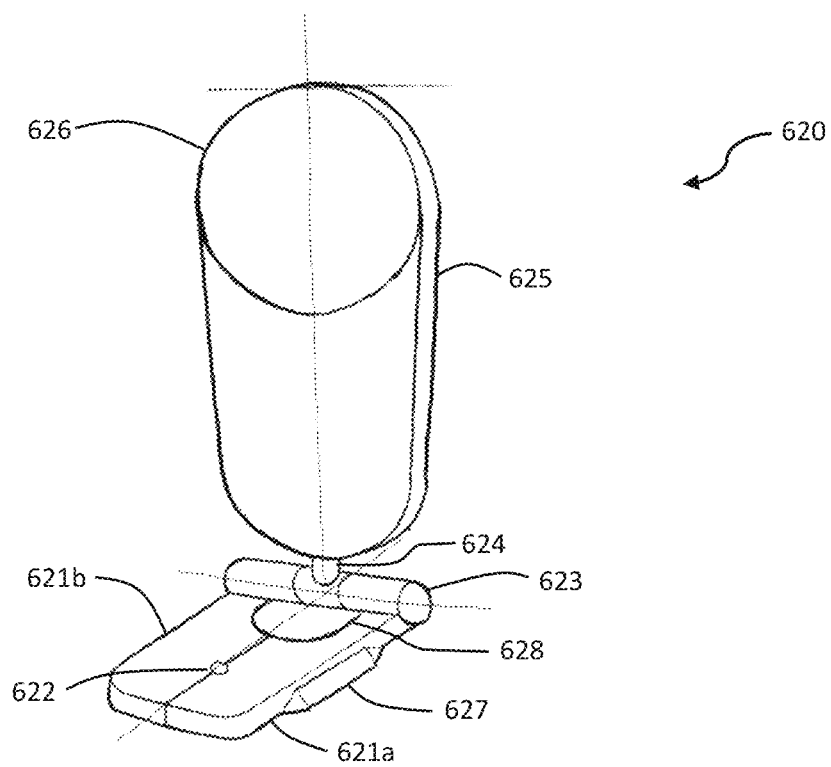

FIG. 39A is an oblique view of a device support with magnetic connector according to some embodiments of the present invention.

Figure 39B:
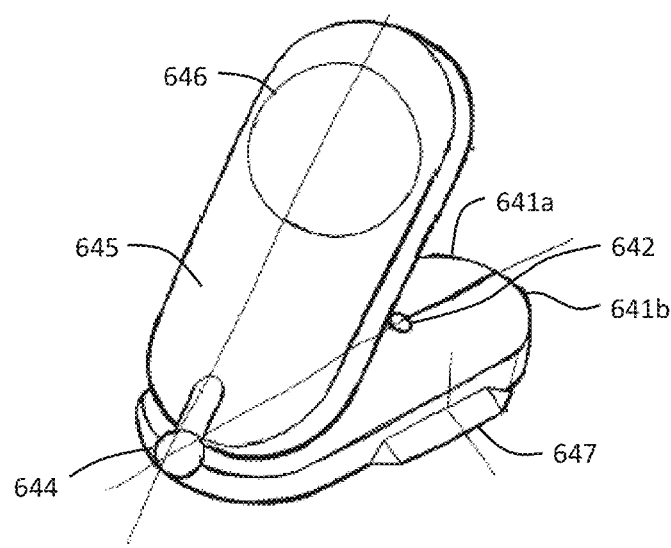

FIG. 39B is an oblique view of a device support with magnetic connector according to some embodiments of the present invention.

Figure 39C:
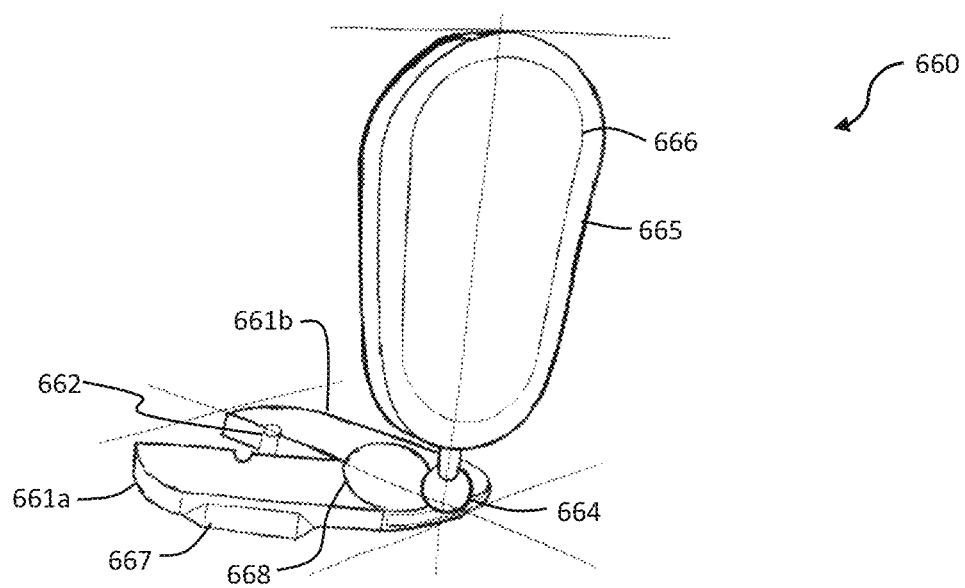

FIG. 39C is an oblique view of a device support with magnetic connector according to some embodiments of the present invention.

Figure 40:
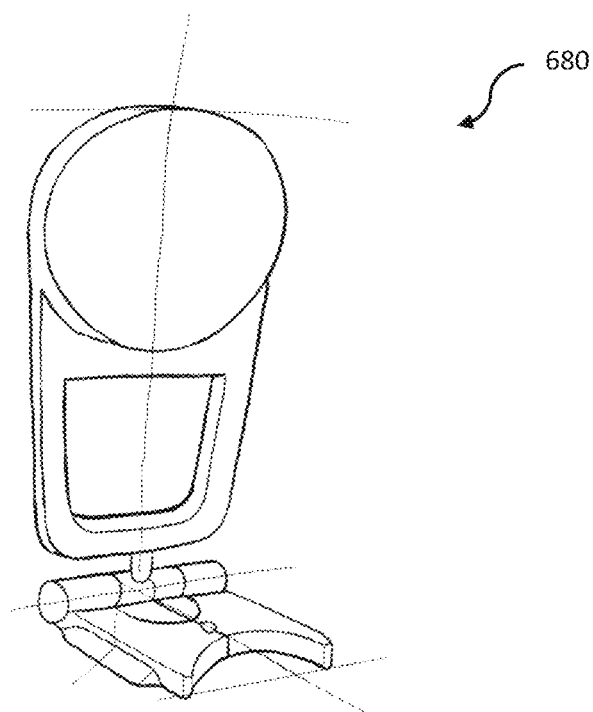
Figure 41A:
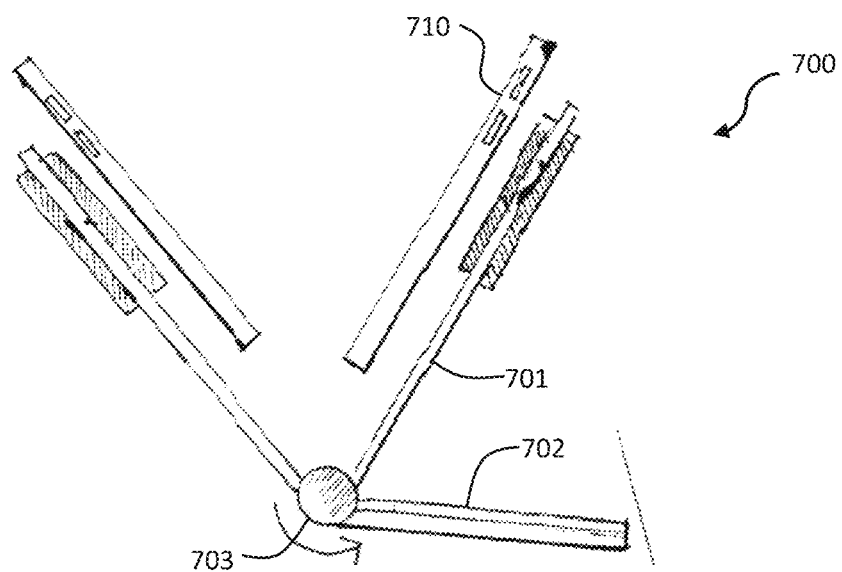
Figure 41B:
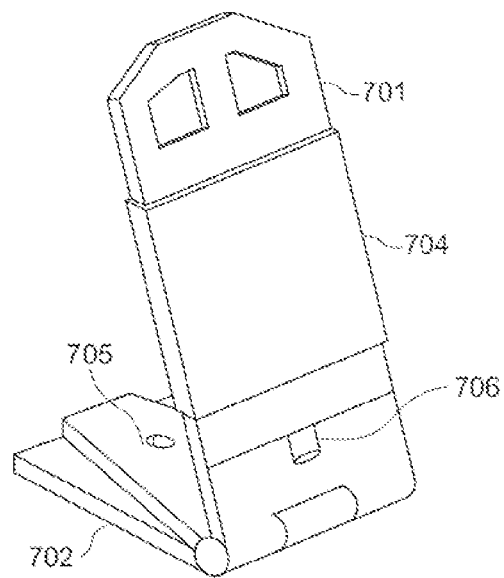
Figure 41C:
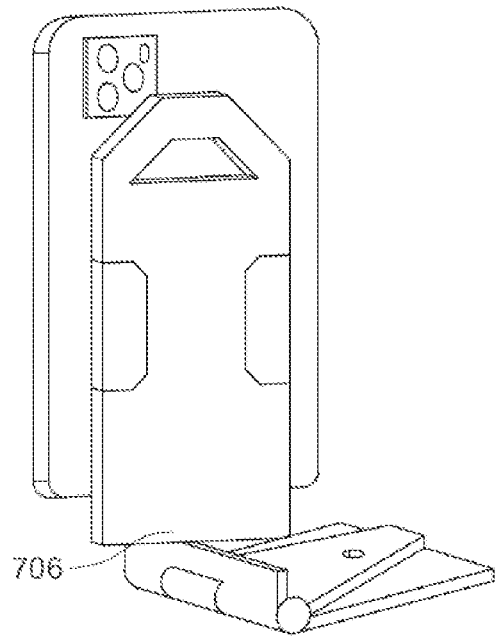
Figure 41D:
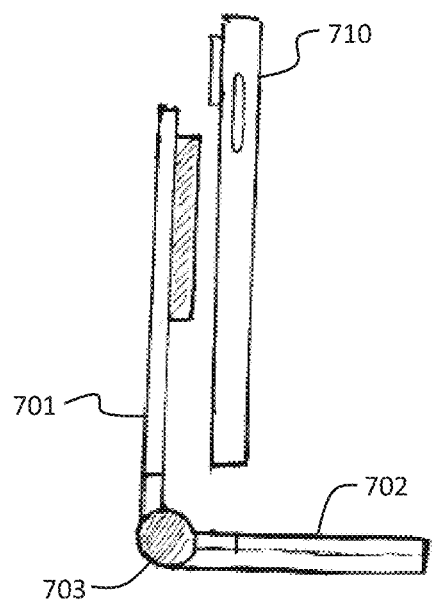
Figure 41E:
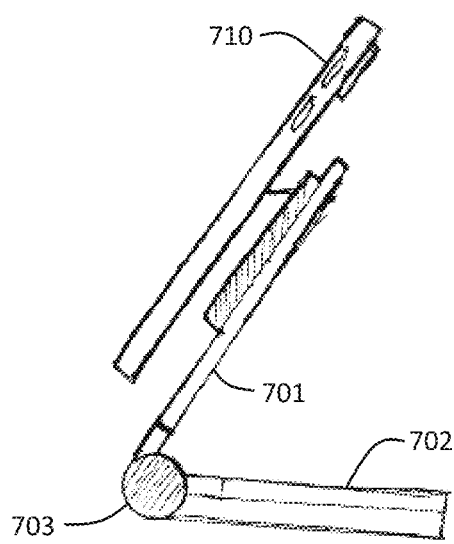

FIG. 40 is an oblique view of a device support with magnetic connector according to some embodiments of the present invention.

FIGS. 41A-41E are views of a device support with magnetic connector according to some embodiments of the present invention.

Figure 42A:
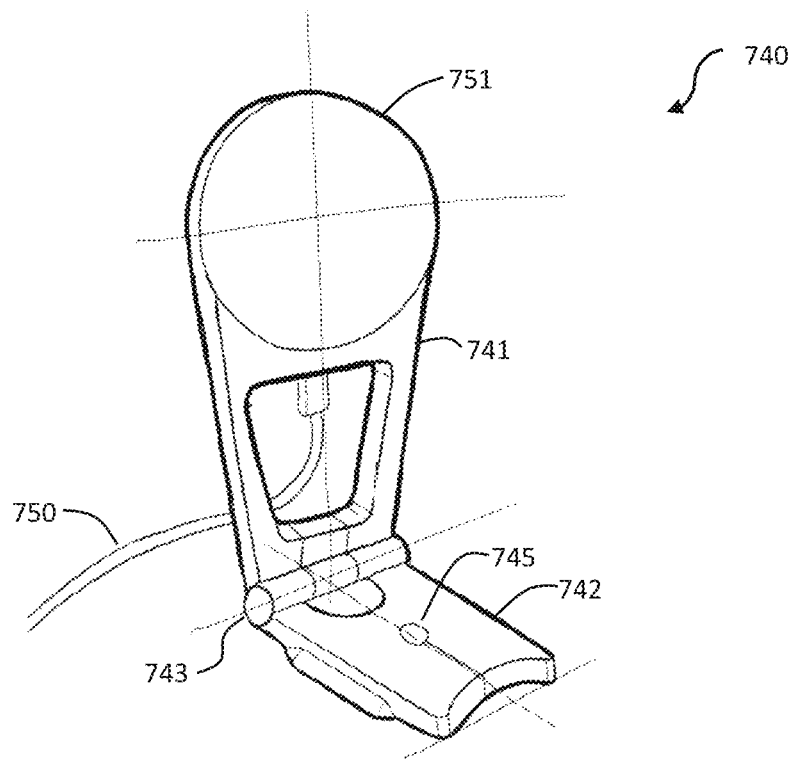
Figure 42B:
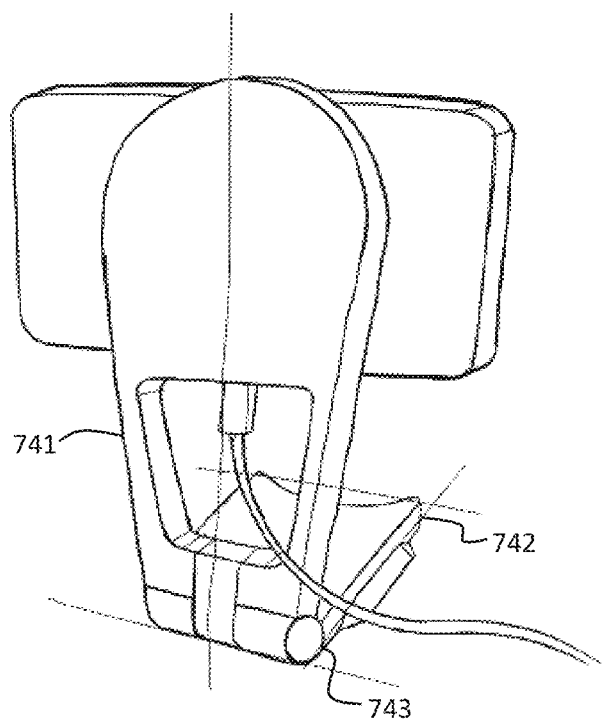

FIGS. 42A-42B are views of a device support with magnetic connector according to some embodiments of the present invention.

Figure 43A:
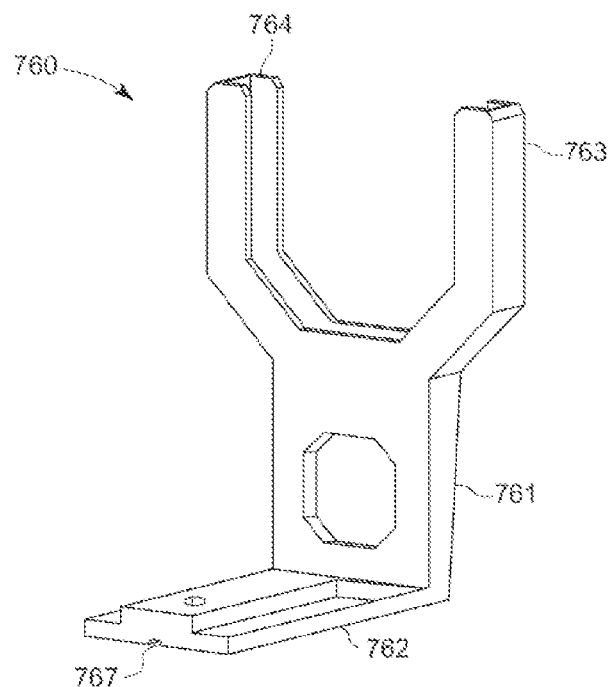
Figure 43B:
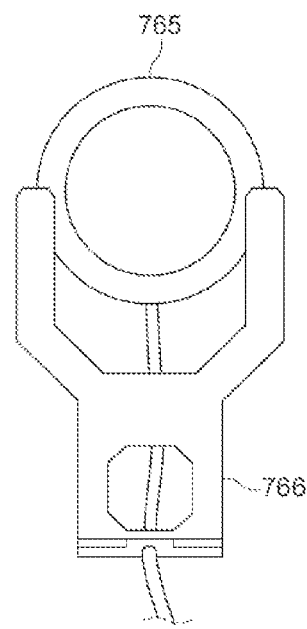
Figure 43C:
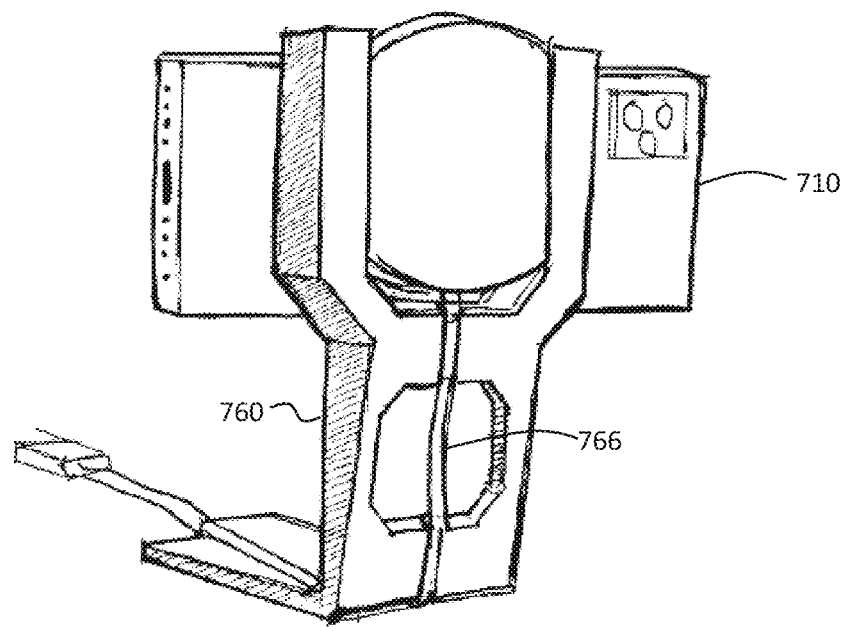

FIGS. 43A-43C are views of a magnetic charger holder according to some embodiments of the present invention.

Figure 44:
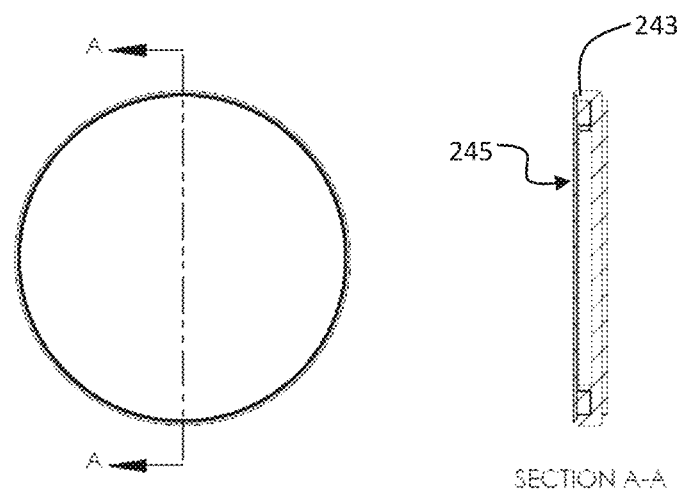

FIG. 44 presents views of a magnetic connector according to some embodiments of the present invention.

Figure 45A:
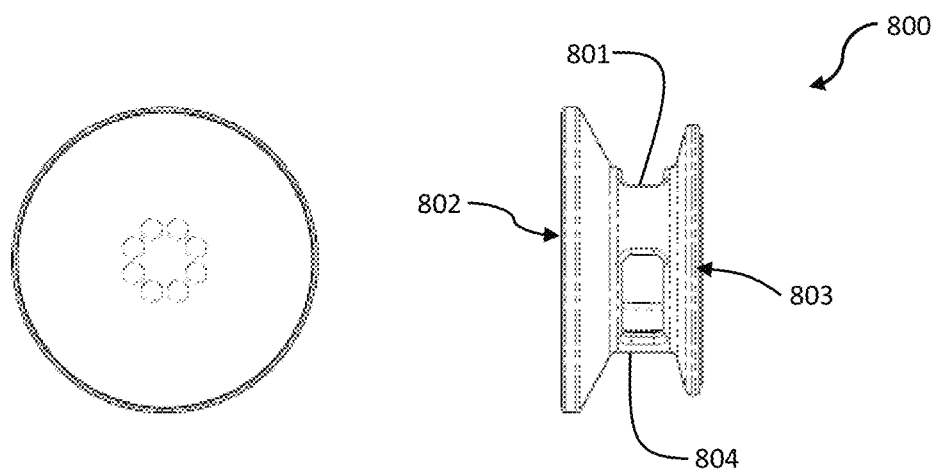
Figure 45B:
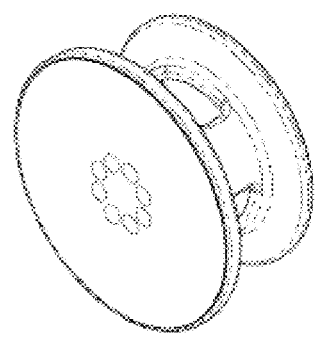
Figure 45C:
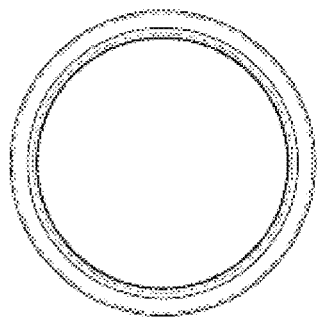

FIGS. 45A-45C present views of a device support with magnetic connector according to some embodiments of the present invention.

Figure 46A:
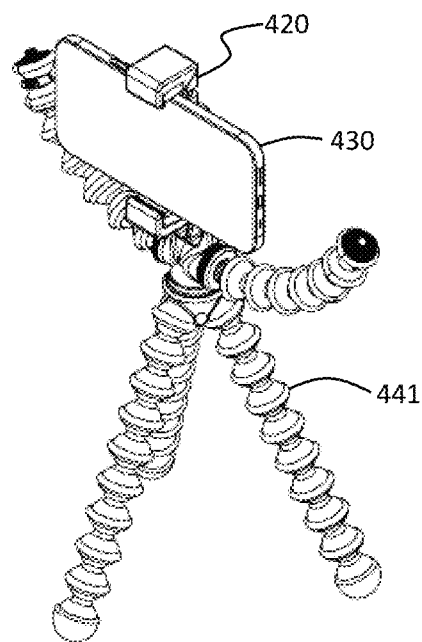
Figure 46B:
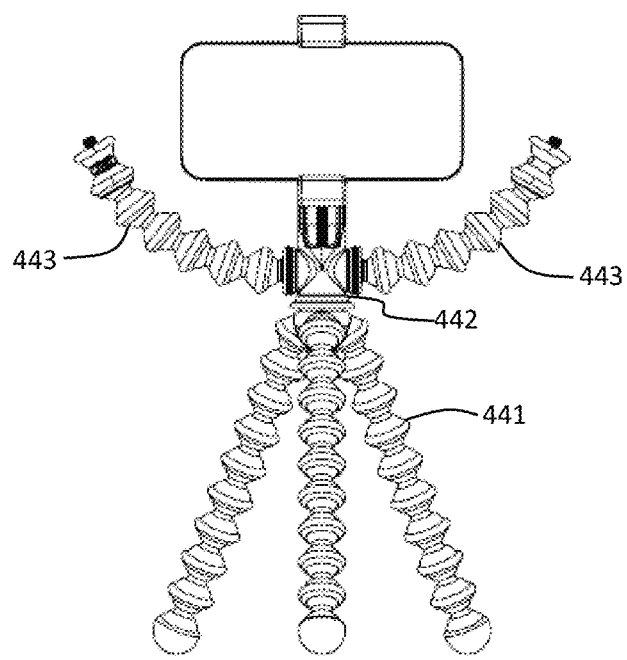

FIGS. 46A-46B illustrate views of a second embodiment of a magnetic gripping clip on a tripod according to some embodiments of the present invention.

SUMMARY OF THE INVENTION

A deployable light for an electronic device, such as a cellular telephone, that attaches to the electronic device with a magnetic connector. The deployable light is adapted to deploy from a stowed position wherein the light may shine in a first direction, to a deployed position wherein the light may shine opposite the first direction. The deployable light may include a magnetic connection portion for attachment to a cellular telephone. The deployable light may provide light when the telephone is using either its forward facing camera or it rearward facing camera.

DETAILED DESCRIPTION

In some embodiments of the present invention, as seen in FIGS. 1A-1F, a clip support with magnetic connector 100 is adapted to magnetically couple to an electronic device, such as a cellular telephone. In some aspects, the clip support 100 couples to a cellular telephone with a magnetic or magnetically susceptible interface, which may be a circular interface. The clip support 100 may have a circular, or substantially circular, connection body 101 coupled to a first bracket support 102. The first bracket support 102 is coupled to a second bracket support 104. The first bracket support 102 and the second bracket support 104 may be joined at a right angle. The bottom surface 108 of the second bracket support 104 may be a flat surface adapted to reside on a support, such as a tripod head, and may be fastened to a threaded post of a tripod or other support using the threaded insert 106. The magnetic coupler 103 may present a flat surface 107 such that the surface 107 is adapted to couple to a magnetic coupling area of a cellular telephone. Side rails 105 on the second bracket support 104 allow for insertion and retention by a clip receiver, as may be seen on a tripod or other support structure.

Figure 11A:
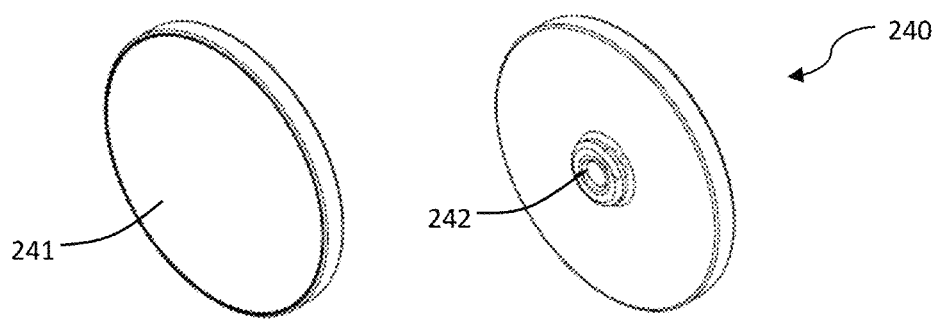
FIGS. 11A-11C present views of a support with magnetic connector according to some embodiments of the present invention.
Figure 11B:
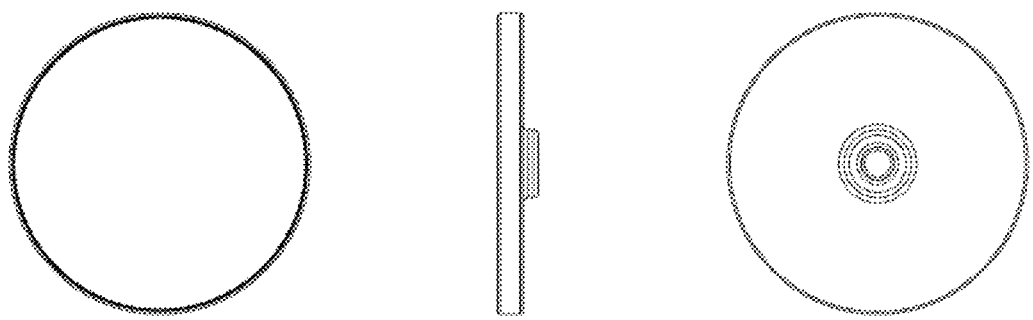
Figure 11C:
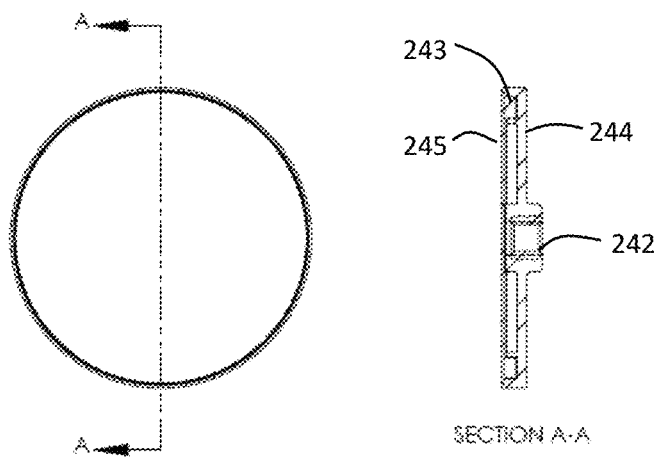

FIG. 11C illustrates a cross-section of a magnetic coupling body as seen in embodiments of the present invention. A front cover 245 provides the mating surface to the device, such as a cellular telephone. In some aspects, the front cover 245 may be of a frictional or resilient material to add to the security of the attachment. A circular magnet 243 resides within the coupling body 244. In some aspects, the circular magnet 243 may have an exterior diameter of 54 mm and an interior diameter of 46 mm, and may be 2.25 mm thick. The circular magnet 243 allows for coupling of the cellular telephone to the clip support, or other accessory as described herein, to a mating magnetic, or magnetically susceptible, interface which also may circular in nature. The circular nature of the interface allows for held positional fit of the clip support to the cellular telephone, and may draw the clip support into this concentric fit if attached close to concentrically initially.

Figure 1A:
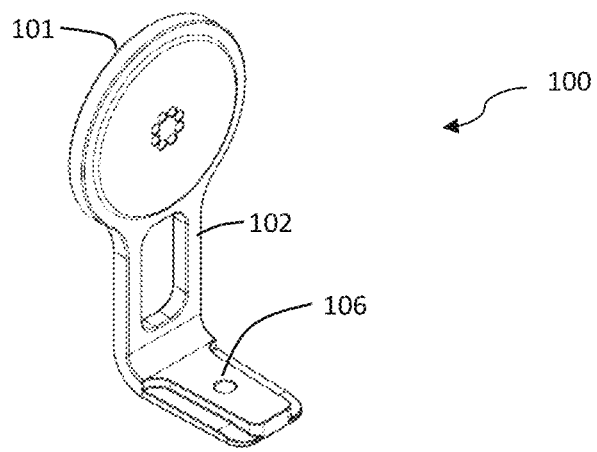
FIGS. 1A-1F are views of a clip support with magnetic connector according to some embodiments of the present invention.
Figure 1B:
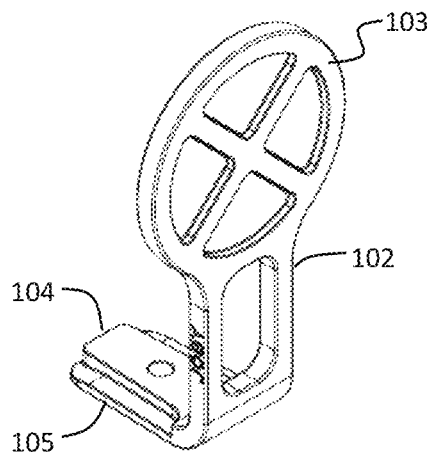
Figure 1C:
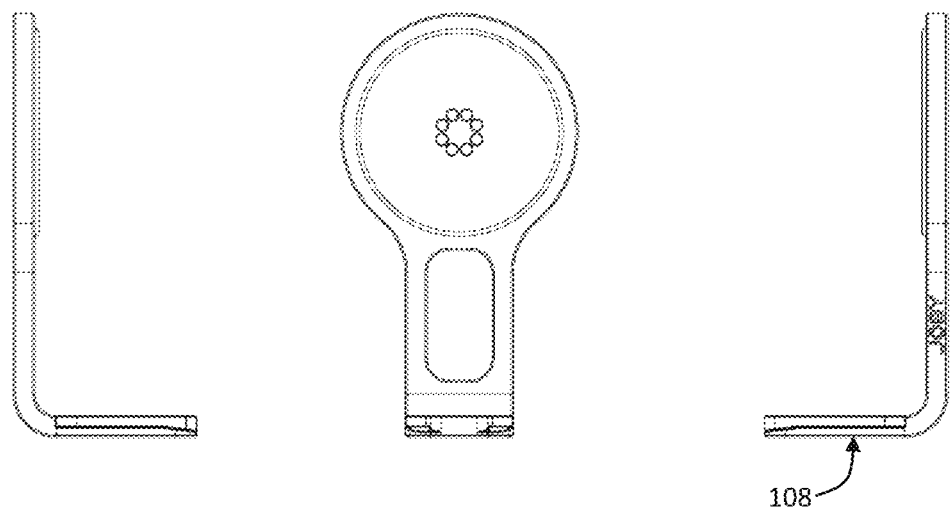
Figure 1D:
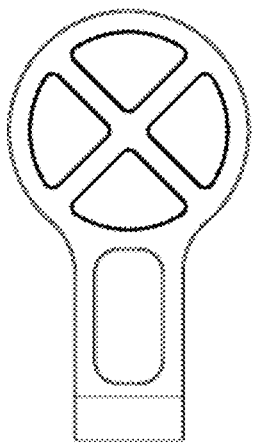
Figure 1E:
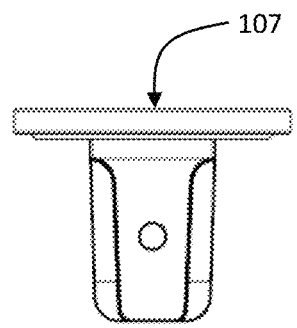
Figure 1F:
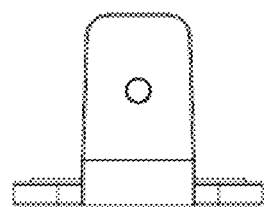
Figure 2A:
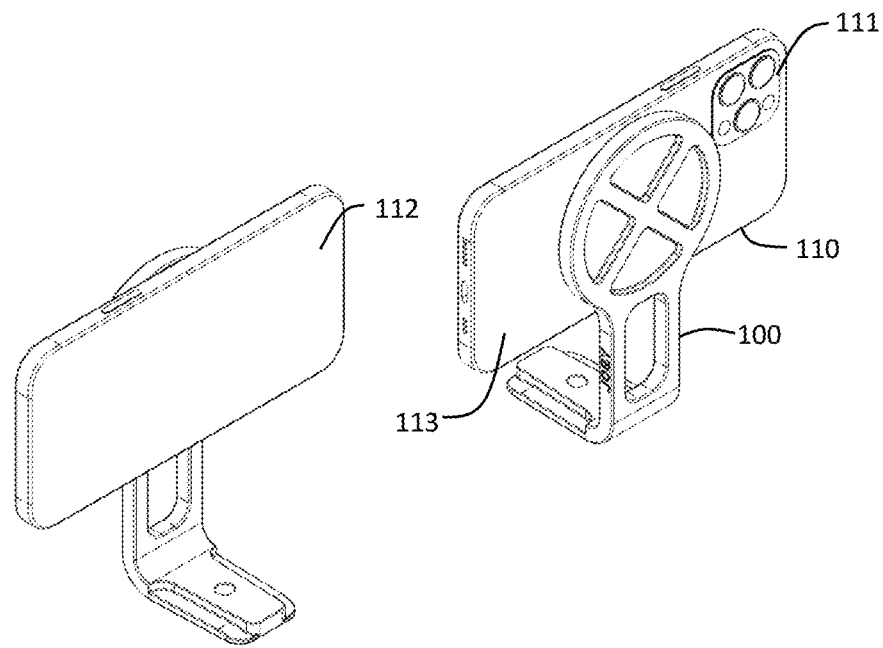
FIGS. 2A-2B present views of a clip support with magnetic connector supporting a cellphone according to some embodiments of the present invention.
Figure 2B:
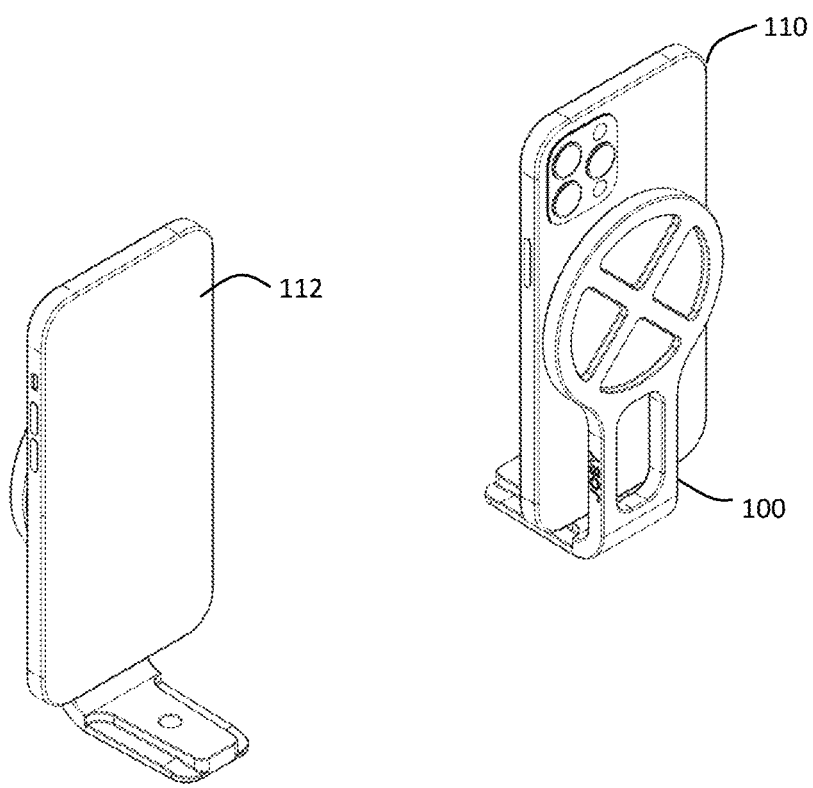

FIG. 2A illustrates a cellular telephone 110 coupled to a clip support with magnetic connector 100 in a landscape configuration. The rear side 113 of the cellular telephone 110 may contain a circular magnetic interface feature. Camera lenses 111 may allow for imaging away from the rear side 113 of the cellular telephone 110. The front side 112 of the cellular telephone 110 is away from the clip support 100. FIG. 2B illustrates a cellular telephone 110 coupled to a clip support with magnetic connector 100 in a portrait configuration.

Figure 3A:
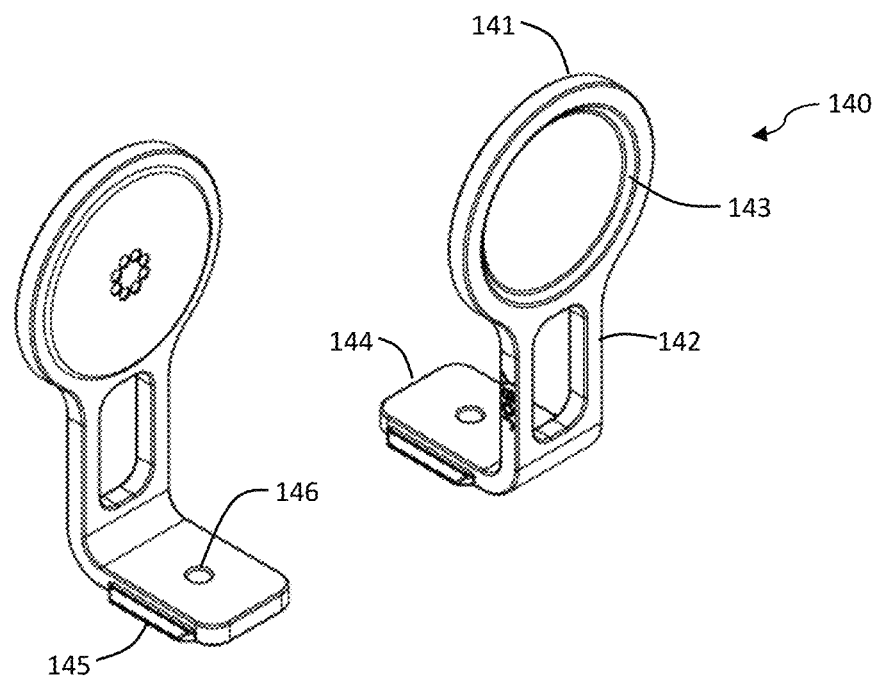
FIGS. 3A-3C are views of a clip support with magnetic connector according to some embodiments of the present invention.
Figure 3B:
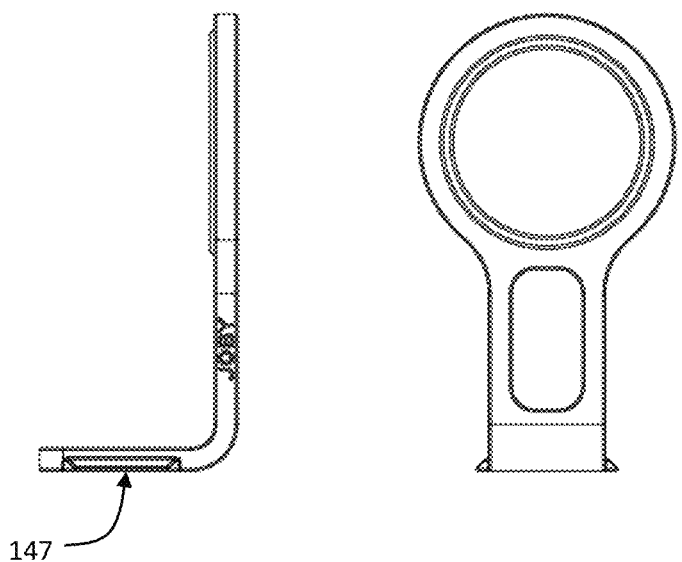
Figure 3C:
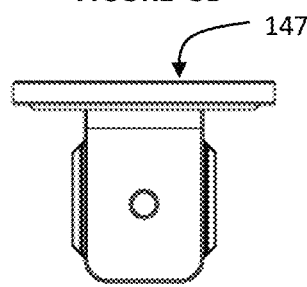

In some embodiments of the present invention, as seen in FIGS. 3A-3C, a clip support with magnetic connector 140 is adapted to magnetically couple to an electronic device, such as a cellular telephone. In some aspects, the clip support 140 couples to a cellular telephone with a magnetic or magnetically susceptible interface, which may be a circular interface. The clip support 140 may have a circular, or substantially circular, connection body 141 coupled to a first bracket support 142. The first bracket support 142 is coupled to a second bracket support 144. The first bracket support 142 and the second bracket support 104 may be joined at a right angle. The bottom surface 108 of the second bracket support 144 may be a flat surface adapted to reside on a support, such as a tripod head, and may be fastened to a threaded post of a tripod or other support using the threaded insert 146. The magnetic coupler may present a flat surface 143 such that the surface 147 is adapted to couple to a magnetic coupling area of a cellular telephone. Side rails 15 on the second bracket support 14 allow for insertion and retention by an Arca-Swiss clip receiver, as may be seen on a tripod or other support structure.

Figure 4A:
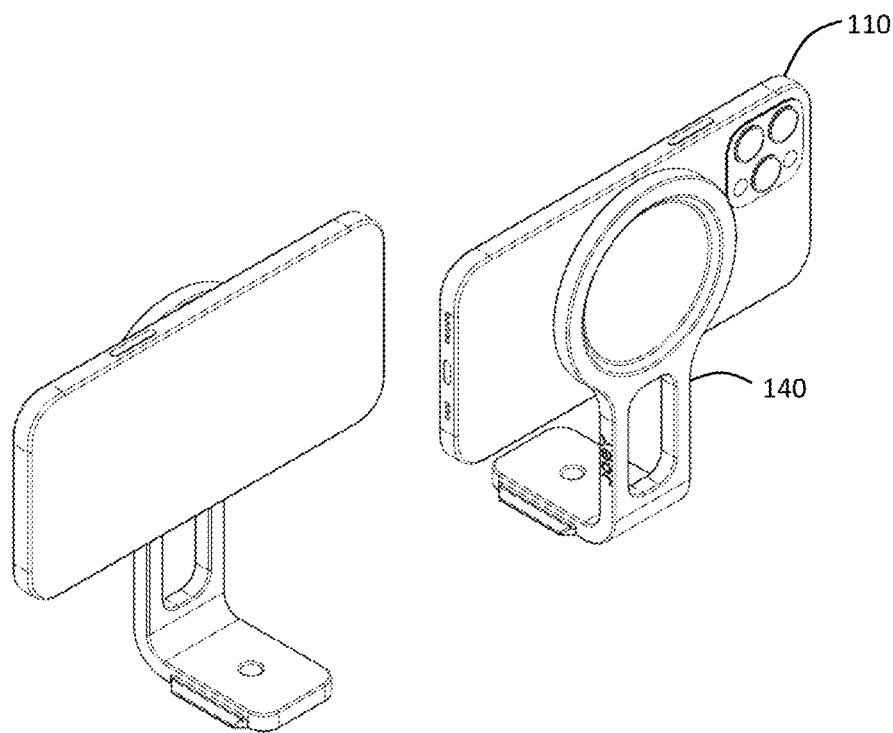
FIGS. 4A-B present views of a clip support with magnetic connector supporting a cellphone according to some embodiments of the present invention.
Figure 4B:
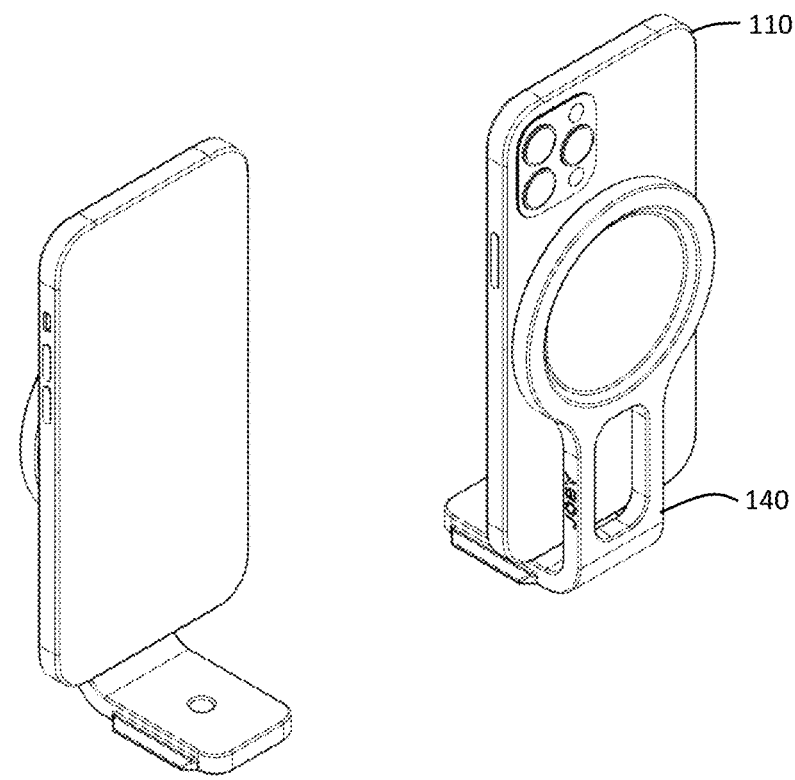

FIG. 4A illustrates a cellular telephone 110 coupled to a clip support with magnetic connector 140 in a landscape configuration. FIG. 4B illustrates a cellular telephone 110 coupled to a clip support with magnetic connector 140 in a portrait configuration.

Figure 5A:
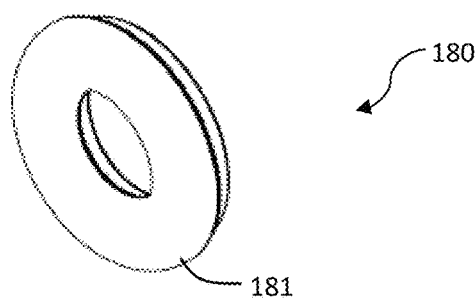
FIGS. 5A-5C are views of a microphone with magnetic connector according to some embodiments of the present invention.
Figure 5B:
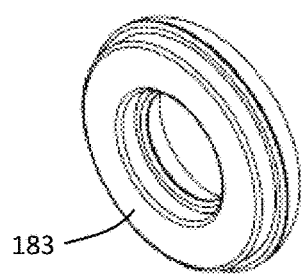
Figure 5C:
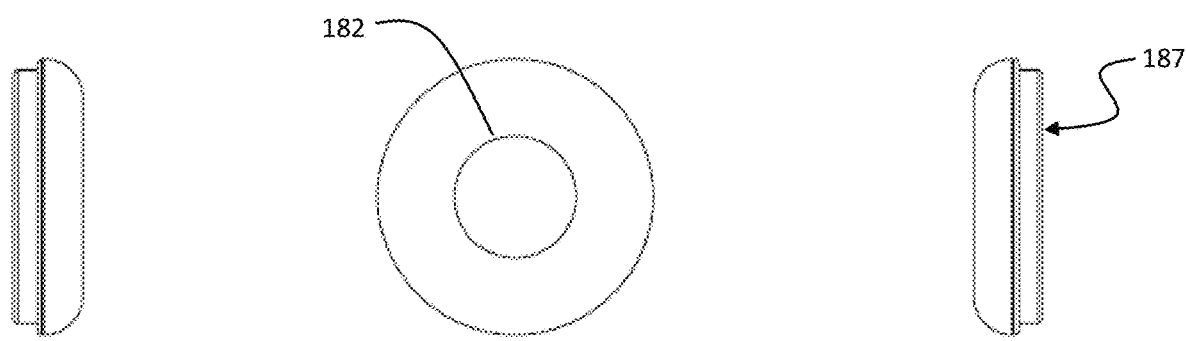
Figure 6A:
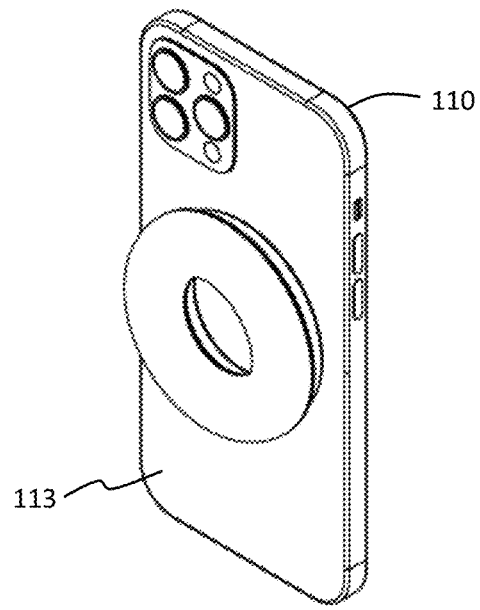
FIGS. 6A-6B are views of a microphone with magnetic connector on a cellphone according to some embodiments of the present invention.
Figure 6B:
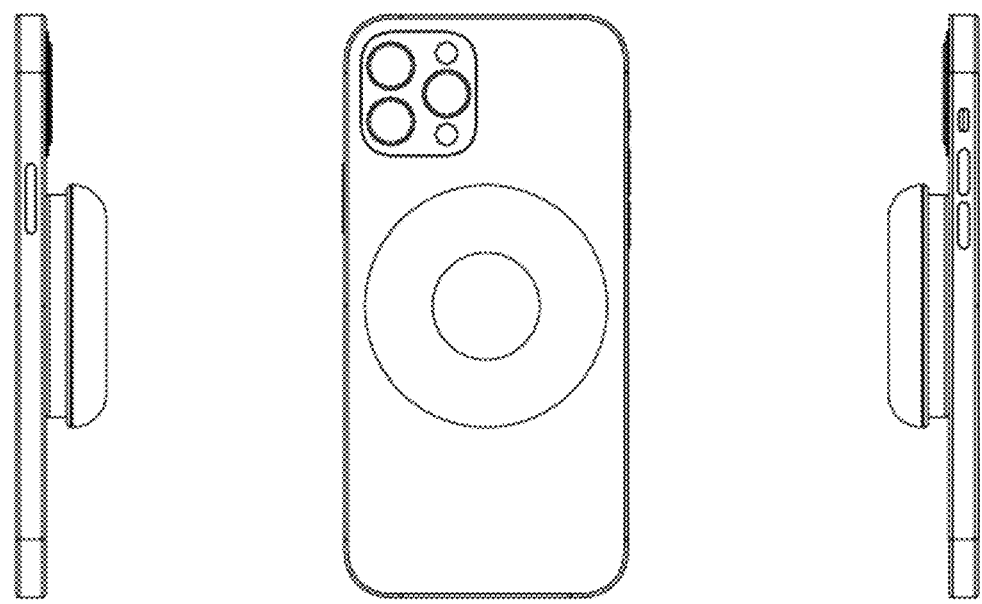

In some embodiments of the present invention, as seen in FIGS. 5A-5C, a microphone with magnetic connector 180 is adapted to magnetically couple to an electronic device, such as a cellular telephone. In some aspects, the microphone 180 couples to a cellular telephone with a magnetic or magnetically susceptible interface, which may be a circular interface. The microphone 180 may have a circular, or substantially circular, connection body 183. The circular body may include battery and one or more microphones. An on-off switch may also be found on the exterior of the circular body. In some aspects, the microphone battery may be recharged using a charger with a cable such as a USB cable, and may have the appropriate port. In some aspects, the microphone battery may be charged without a cable, such as with a magsafe system. The microphone may be covered with an appropriate wind screening material 181. The microphone 180 may be annular with a through hole 182. FIGS. 6A-6B illustrate the microphone with magnetic connector on a cellular telephone 110.

Figure 7A:
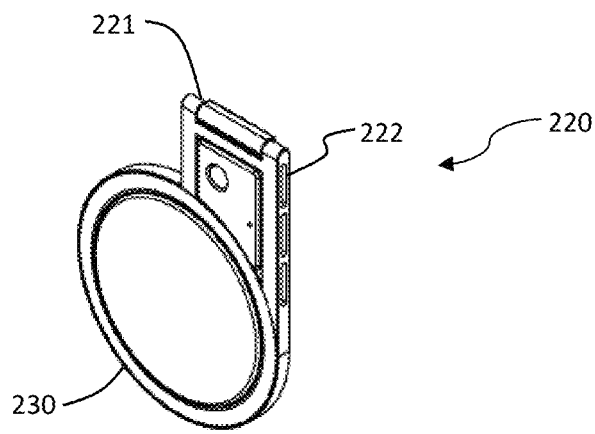
FIGS. 7A-7E are views of a flip up light with magnetic connector according to some embodiments of the present invention.
Figure 7B:
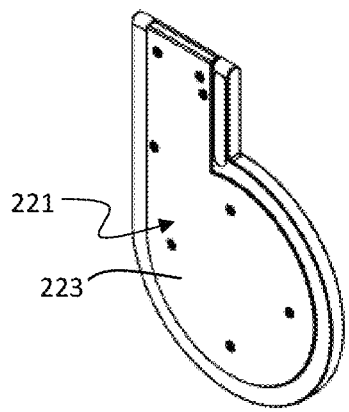
Figure 7C:
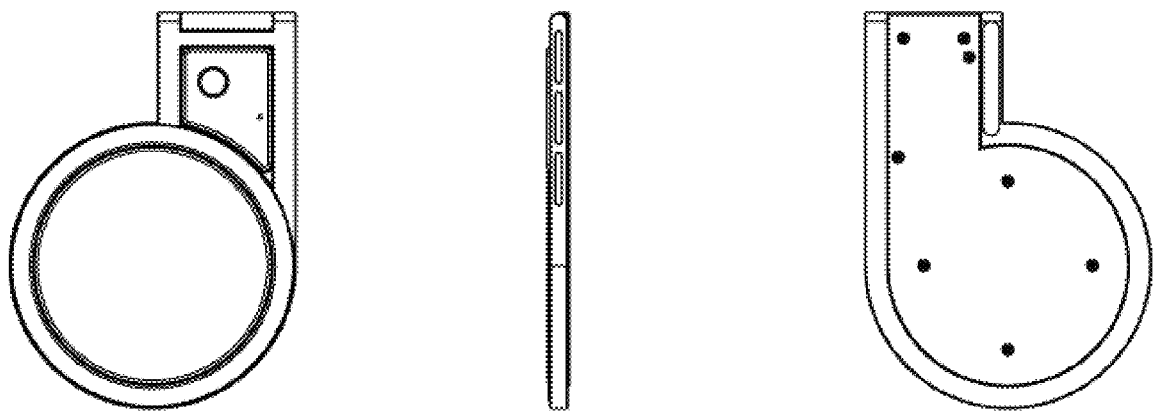

In some embodiments of the present invention, as seen in FIGS. 7A-7C, a deployable light with magnetic connector 220 is adapted to magnetically couple to an electronic device, such as a cellular telephone.

In some aspects, the deployable light 220 couples to a cellular telephone with a magnetic or magnetically susceptible interface, which may be a circular interface. The deployable light 220 may have a circular, or substantially circular, connection body 223. The connection body may have a cover 235 which provides the mating surface to the device, such as a cellular telephone. In some aspects, the cover 235 may be of a frictional or resilient material to add to the security of the attachment. A magnet, which may be a circular magnet, resides within the coupling body connection. In some aspects, the circular, annular, magnet may have an exterior diameter of 54 mm and an interior diameter of 46 mm, and may be 2.25 mm thick. The circular magnet allows for coupling of the cellular telephone to the deployable light, to a mating magnetic, or magnetically susceptible, interface which also may circular in nature. The circular nature of the interface allows for held positional fit of the clip support to the cellular telephone, and may draw the clip support into this concentric fit if attached close to concentrically initially.

An extension portion 231 of the connection body 223 may culminate in a pivot 221 which is adapted to allow for the deployment of a lighting element 230. In some aspects, the connection body 223 may include a battery electrically coupled to the lighting element 230. In some aspects, the battery may reside within the annulus of the circular magnet. An on/off button and cord ports for charging may be found on the extension 222 or other suitable location.

In the stowed configuration of FIGS. 7A-7C, the lighting element 230 is laid over the connection body. The lighting element 224 may be a circular, annular, lighting element with an inner surface 234. The connection body 223 may have a raised external surface 235. In some aspects, the inner surface 234 of the lighting element 224 may reside around external surface 235 of the connection body 223 in the stowed configuration. In some aspects, the lighting element 224 is comprised of a plurality of LEDs arranged in a circular pattern.

Figure 7D:
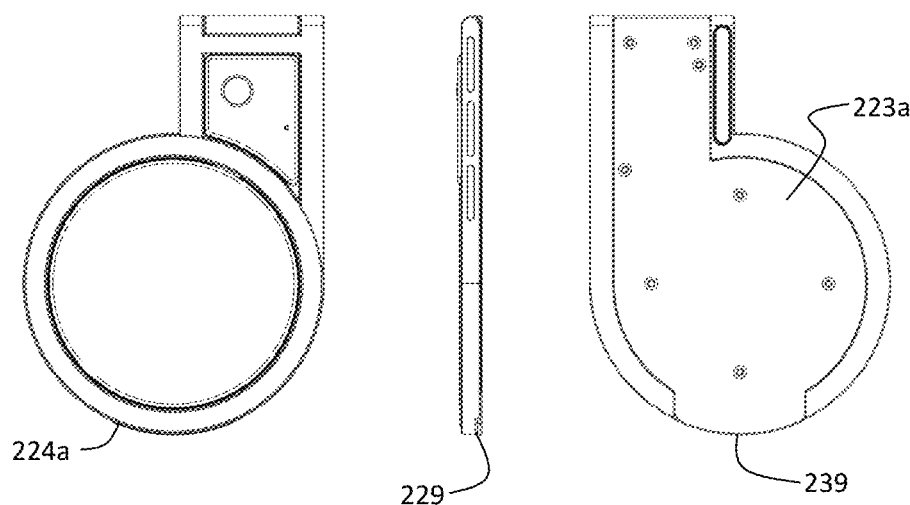
Figure 7E:
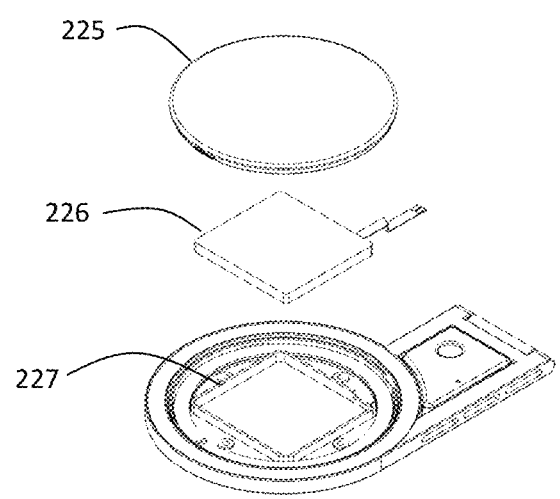

FIG. 7D illustrates a variation of the lighting element further including a tab 239 which is an extension of the back surface 235 of the connection body 223a. The lighting element 224a of this variation may also have a recess 229 to allow room for the tab 239. This tab 230 and recess 229 may allow a user to utilize the recess 229, for example with a fingernail, to more easily move the lighting element from the stowed configuration to the deployed configuration. FIG. 7E illustrates an exploded view of a connection body 223, illustrating a battery 226 which may reside in a recess 227 within the annulus of the circular magnet. A top surface plate 225 of the connection body resides over the battery 226 and is the outside surface of this portion of the connection body.

Figure 8A:
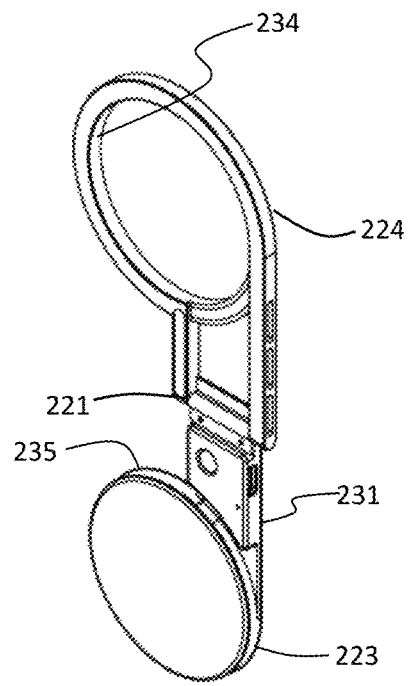
FIGS. 8A-8C are views of a flip up light with magnetic connector in a flipped up configuration according to some embodiments of the present invention.
Figure 8B:
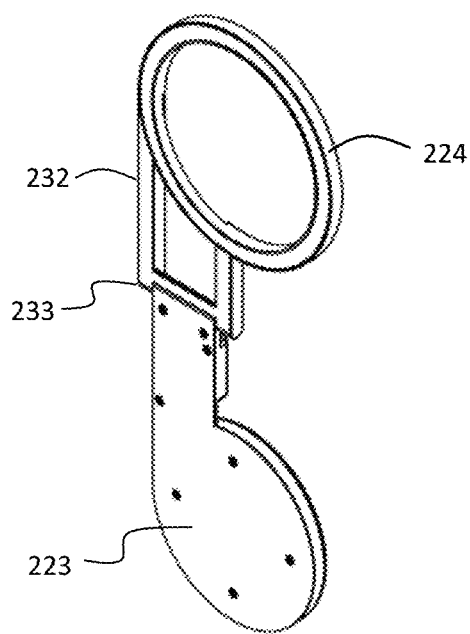
Figure 8C:
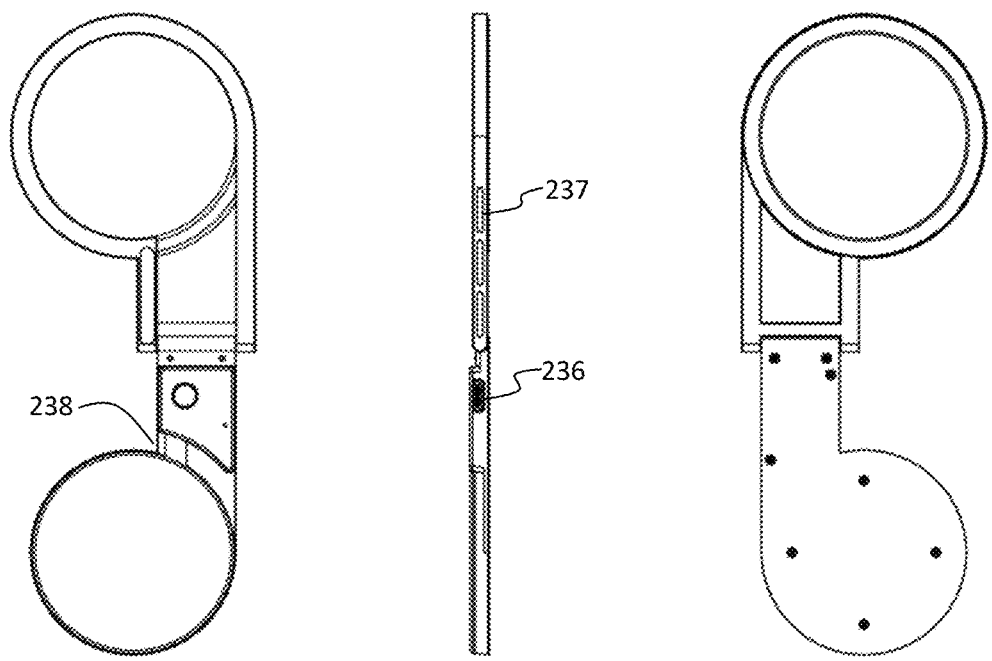

FIGS. 8A-8C illustrate the lighting element in a deployed configuration. In the deployed configuration the lighting element has been deployed 180 degrees from its position in the stowed configuration. The deployable light may have detents, or a mechanical stop, such that the lighting element is held in the deployed configuration with sufficient force that the lighting element will not pivot away from the deployed configuration in normal use, without further force purposefully applied by the user. A gap 238 between the raised external surface 235 of the connection body 223 and the raised area of the extension portion 231 allows the circular lighting element 224 to fit into the gap when the deployable light 220 is in the stowed configuration.

A charging port 236 is adapted to allow for the coupling of an external charging cord to the deployable light. In some aspects, the charging port may be compatible with a USB-C plug. One or more control buttons 237 allow the user to turn the lighting element of the deployable light on and off. In some aspects, the control buttons 237 may also allow the user to select various brightness levels for the light.

Figure 9A:
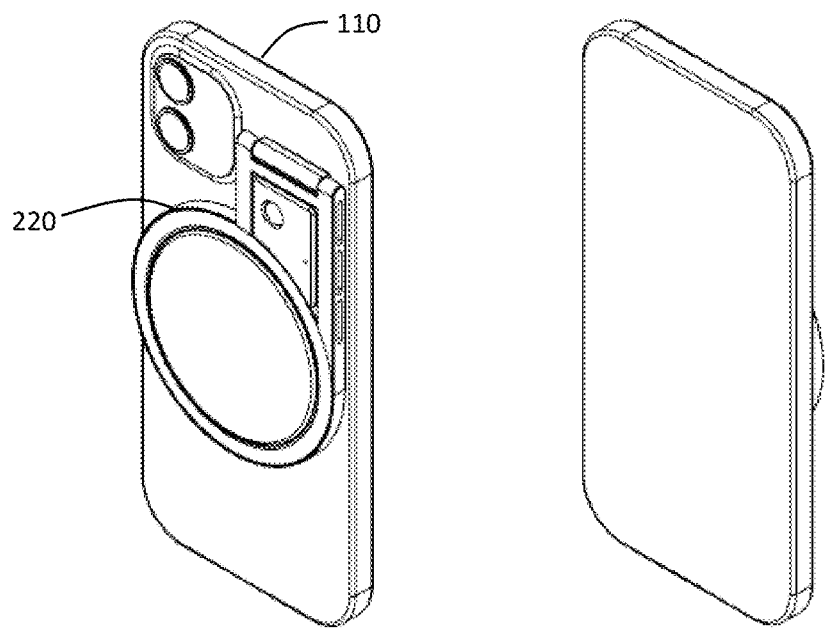
FIGS. 9A-9B present views of a flip up light with magnetic connector on a cell phone according to some embodiments of the present invention.
Figure 9B:
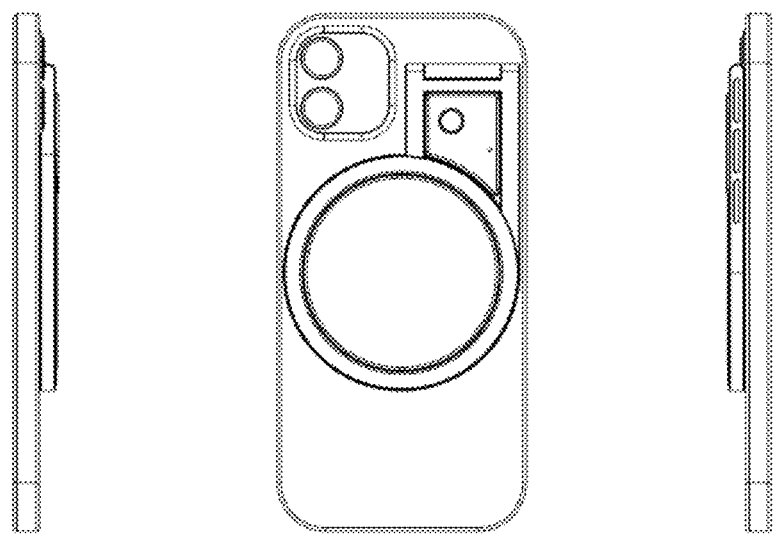
Figure 10A:
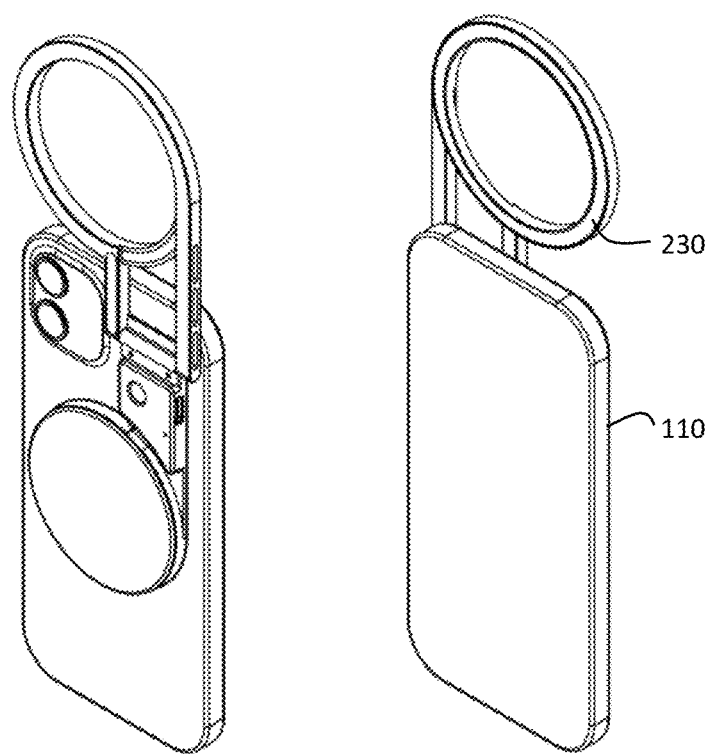
FIGS. 10A-10B present views of a flip up light with magnetic connector in a flipped up configuration on a cell phone according to some embodiments of the present invention.
Figure 10B:
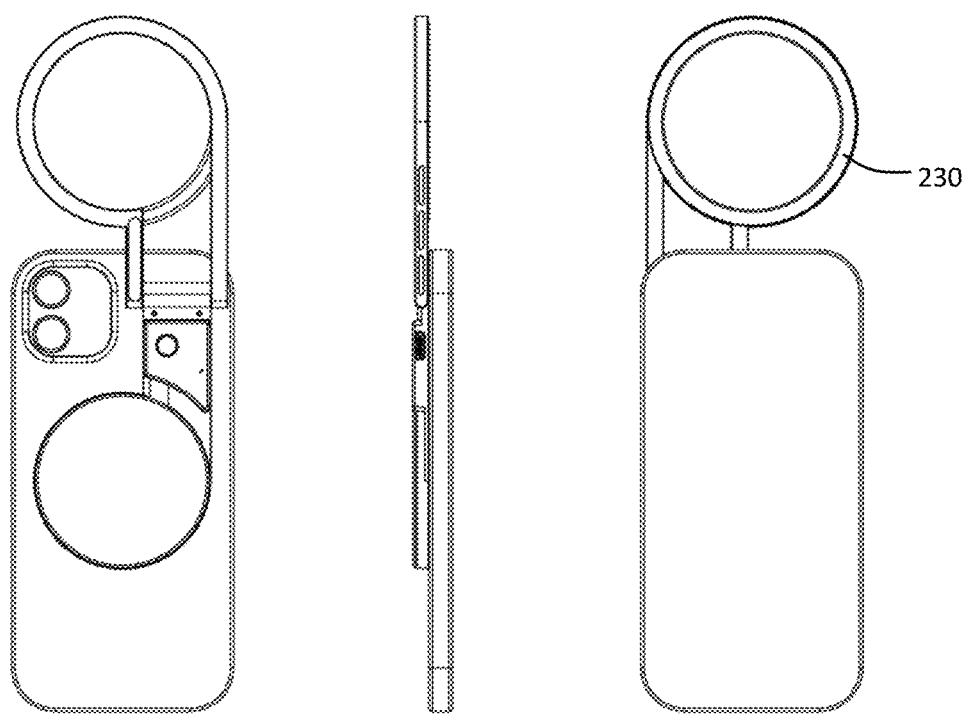

FIGS. 9A and 9B illustrate the deployable light 220 on a cellular telephone 110, with the light in a stowed configuration. The magnet within the connection body 223 has magnetically coupled to the cellular telephone 110. This stowed configuration allows for the light to shine in a direction to the rear of the cellular telephone. FIGS. 10A and 10B illustrate the deployable light 220 on a cellular telephone 110, with the light in a deployed configuration. This deployed configuration allows for the light to shine in a direction to the front of the cellular telephone. In the deployed configuration, a user may use the cellular telephone for video recording or communication using the forward facing camera function of the cellular telephone, which may allow the user to observe themself in real time during the video call, for example.

Figure 12A:
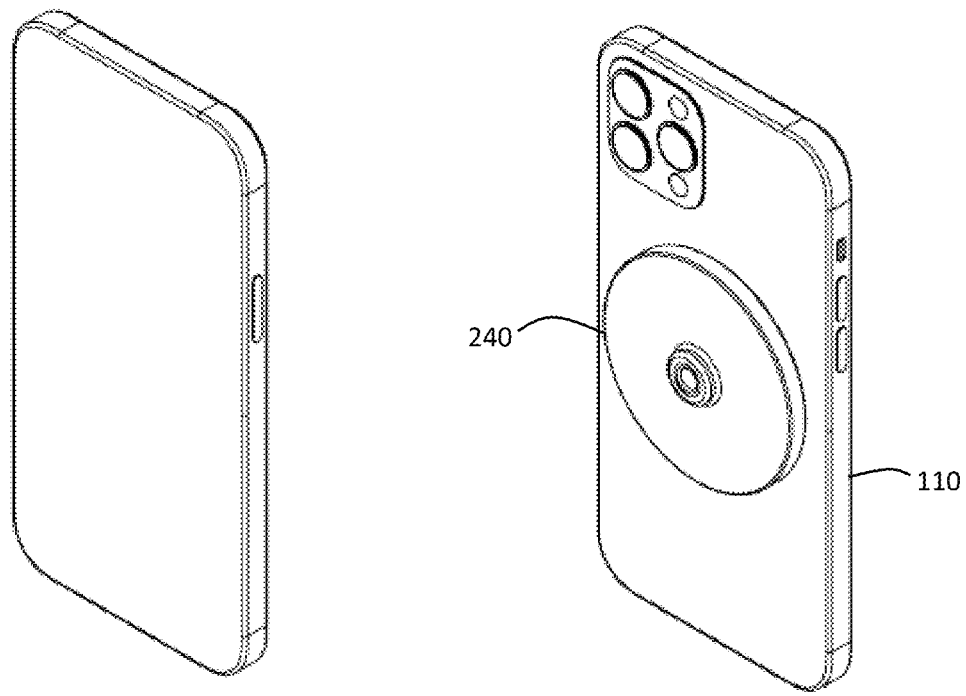
FIGS. 12A-12B present views of a support with magnetic connector on a cell phone according to some embodiments of the present invention.
Figure 12B:
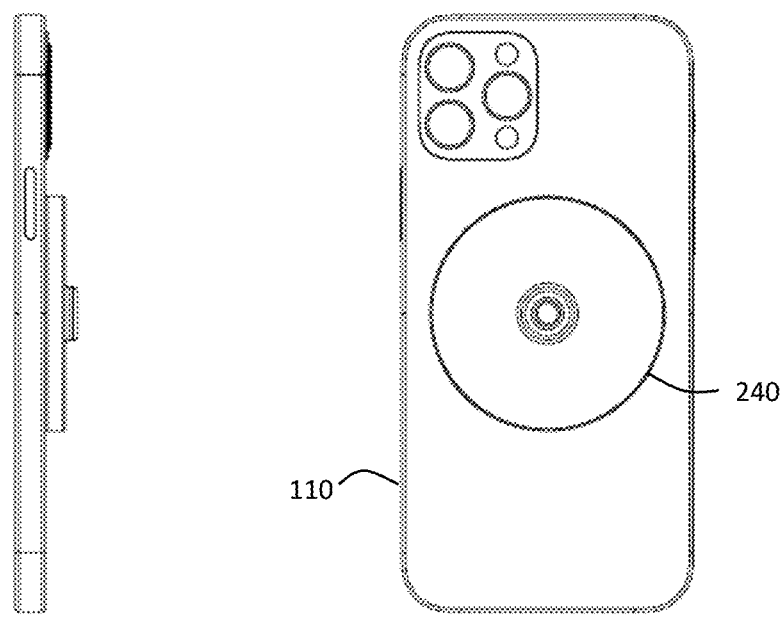

In some embodiments of the present invention, as seen in FIGS. 11A-11C, a support with magnetic connector 240 is adapted to magnetically couple to an electronic device, such as a cellular telephone. In some aspects, the support 240 couples to a cellular telephone with a magnetic or magnetically susceptible interface, which may be a circular interface. The support 240 may have a circular, or substantially circular, connection body 241 which presents a flat surface such that the surface is adapted to couple to a magnetic coupling area of a cellular telephone. A threaded insert 242 allows for attachment of the support 240 to a support structure with a threaded post. FIGS. 12A and 12B illustrate the support 240 on a cellular telephone 110.

Figure 13A:
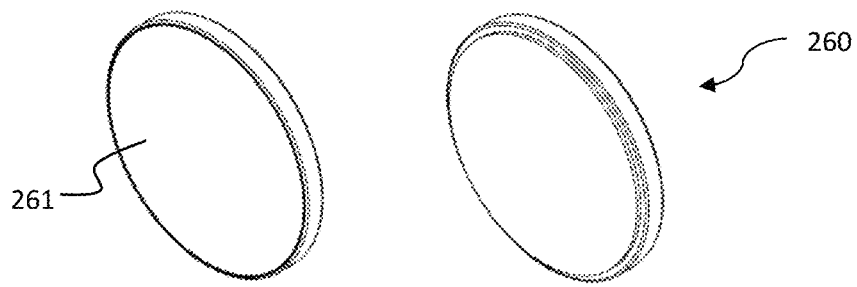
FIGS. 13A-13B present views of an adhesive support with magnetic connector according to some embodiments of the present invention.
Figure 13B:
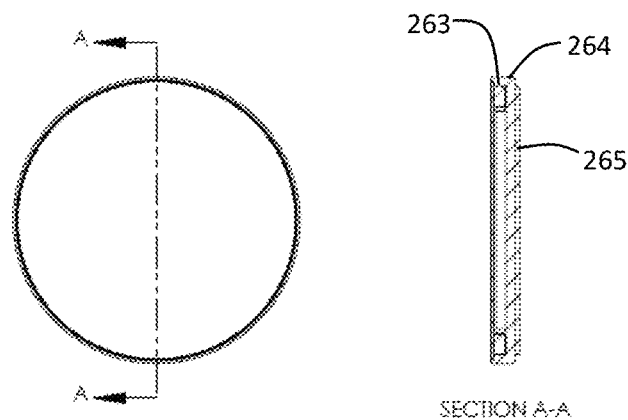
Figure 14:
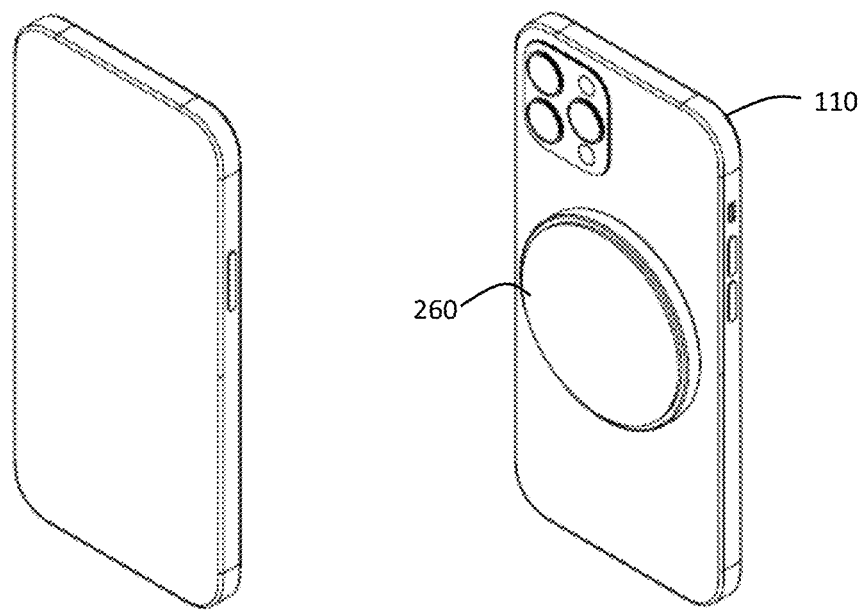
FIG. 14 presents oblique views of an adhesive support with magnetic connector on a cell phone according to some embodiments of the present invention.

In some embodiments of the present invention, as seen in FIGS. 13A and 13B a support with magnetic connector 260 is adapted to magnetically couple to an electronic device, such as a cellular telephone. In some aspects, the support 260 couples to a cellular telephone with a magnetic or magnetically susceptible interface, which may be a circular interface. The support 260 may have a circular, or substantially circular, connection body 265 which presents a flat surface 261 such that the surface is adapted to couple to a magnetic coupling area of a cellular telephone. An adhesive surface 265 allows for attachment of the support 260 to a surface. FIG. 14 illustrates the support 260 on a cellular telephone 110.

Figure 15A:
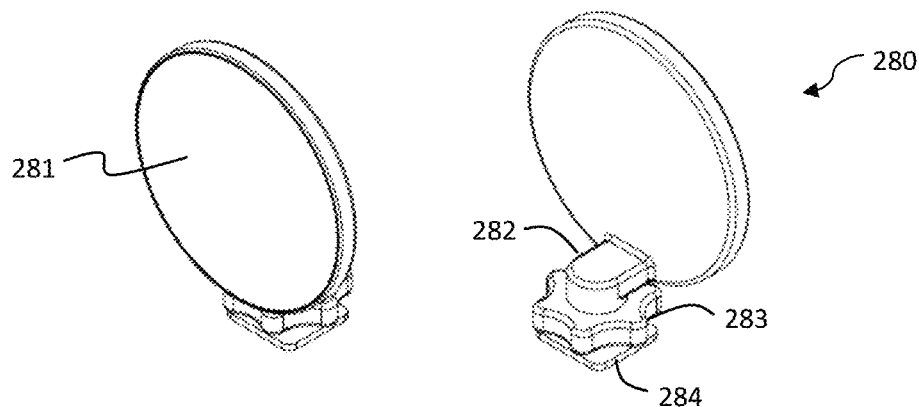
FIGS. 15A-15C present views of a magnetic connector with cold shoe mount according to some embodiments of the present invention.
Figure 15B:
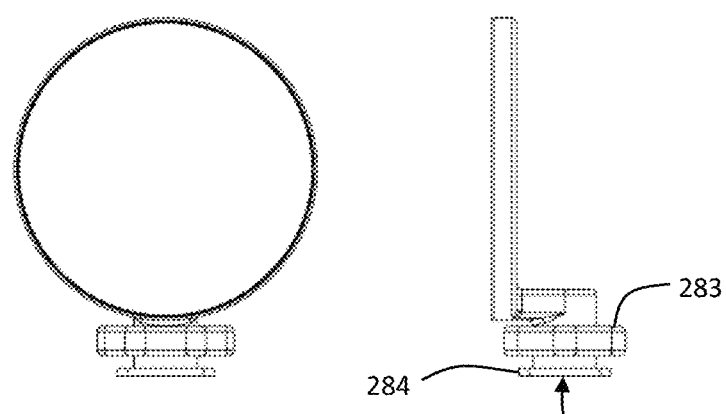
Figure 15C:
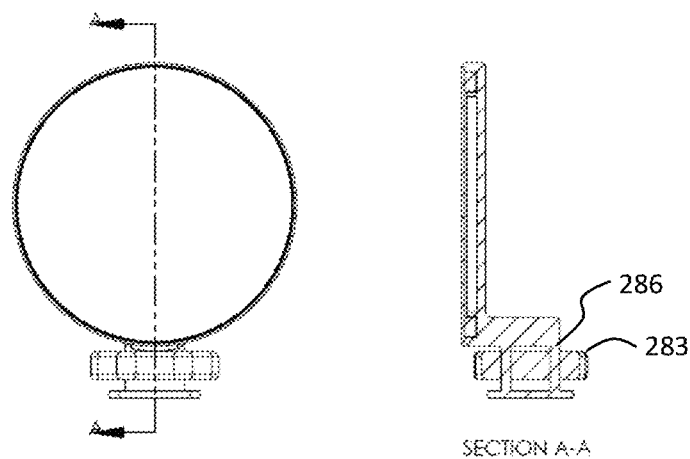

In some embodiments of the present invention, as seen in FIGS. 15A-15C, a cold shoe clip with magnetic connector 280 is adapted to magnetically couple to an electronic device, such as a cellular telephone. In some aspects, the cold shoe clip with magnetic connector 180 couples to a cellular telephone with a magnetic or magnetically susceptible interface, which may be a circular interface. The cold shoe clip with magnetic connector 180 may have a circular, or substantially circular, connection body 281. The circular body may include an extension with a cold shoe clip 284. The cold shoe clip may have a bottom mounting surface 285. A tightening nut 283 is adapted to cinch down and tighten to hold the cold shoe clip to it mating interface. FIG. 16 illustrate the cold shoe clip with magnetic connector 280 on a cellular telephone 110.

In some embodiments of the present invention, as seen in FIG. 17, a support with magnetic connector 300 is adapted to magnetically couple to an electronic device, such as a cellular telephone. In some aspects, the support 300 couples to a cellular telephone with a magnetic or magnetically susceptible interface, which may be a circular interface. The support 300 may have a circular, or substantially circular, connection body which presents a flat surface such that the surface is adapted to couple to a magnetic coupling area of a cellular telephone. A multi-planar extension 301 allows for attachment of the support 300 to a support structure with a mating structure. FIG. 18 illustrates the support 300 on a cellular telephone 110.

In some embodiments of the present invention, as seen in FIGS. 19A-19C, a tripod with magnetic connector 320 is adapted to magnetically couple to an electronic device, such as a cellular telephone. In some aspects, the tripod with magnetic connector 320 couples to a cellular telephone with a magnetic or magnetically susceptible interface, which may be a circular interface. The tripod with magnetic connector 320 may have a circular, or substantially circular, connection body which presents a flat surface such that the surface is adapted to couple to a magnetic coupling area of a cellular telephone. A trio of legs 322, 323, 324 is adapted to stow in plane with each other and the connection body, and to pivot 325 to a deployed configuration. The legs may have plug extensions 327.

FIG. 20 illustrates the tripod with magnetic connector 320 in a stowed configuration on a cellular telephone 110. FIGS. 21A and 21B illustrate the tripod with magnetic connector 320 in a deployed position with the legs 322, 323, 324 extended in order to support a cellular telephone.

In some embodiments of the present invention, as seen in FIGS. 22A and 22B, a clip with magnetic connector 360 is adapted to magnetically couple to an electronic device, such as a cellular telephone. In some aspects, the clip with magnetic connector 360 couples to a cellular telephone with a magnetic or magnetically susceptible interface, which may be a circular interface. The clip with magnetic connector 360 may have a circular, or substantially circular, connection body 361. The circular body may include a recess 363 with a clip 362 within the recess, which may be adapted to clip into a clip receiver, such as may be seen on a tripod. FIG. 23 illustrate the clip with magnetic connector 360 on a cellular telephone 110.

In some embodiments of the present invention, as seen in FIGS. 24A and 24B, a clip and ring with magnetic connector 380 is adapted to magnetically couple to an electronic device, such as a cellular telephone. In some aspects, the clip and ring with magnetic connector 380 couples to a cellular telephone with a magnetic or magnetically susceptible interface, which may be a circular interface. The clip and ring with magnetic connector 380 may have a circular, or substantially circular, connection body. The circular body may include a recess 383 with a clip 382 within the recess, which may be adapted to clip into a clip receiver, such as may be seen on a tripod. A deployable ring 384 may also reside in the recess 383. The ring 384 may stow into the recess, and the deploy to allow for the insertion of a finger, for example. FIG. 25 illustrates the clip and ring with magnetic connector 380 on a cellular telephone 110.

In some embodiments of the present invention, as seen in FIGS. 26A-26F, a first embodiment of a magnetic gripping clip for an electronic device 400 is adapted to magnetically couple to an electronic device, such as a cellular telephone. In some aspects, the gripping clip with magnetic connector 400 couples to a cellular telephone with a magnetic or magnetically susceptible interface, which may be a circular interface. The gripping clip with magnetic connector 400 may have a circular, or substantially circular, magnetic connection body 401. The circular magnetic connection body may be coupled to a clip body cross bracket 403 which may be rotatably coupled to the clip main post. The cross bracket may be centrally connected, at its center, to the main post 402. The clip body cross bracket has a first gripping arm 404 and a second gripping arm 405, which may be extendable relative to the clip body cross bracket 403. A main post 402 has a first end and a second end. The first end of said main post is coupled to the clip body cross bracket 403. A mount 408 is coupled to the main post. The mount 408 may have a threaded insert 409 such that the mount 408 may be coupled to threaded post, such as seen on a tripod.

Figure 26A:
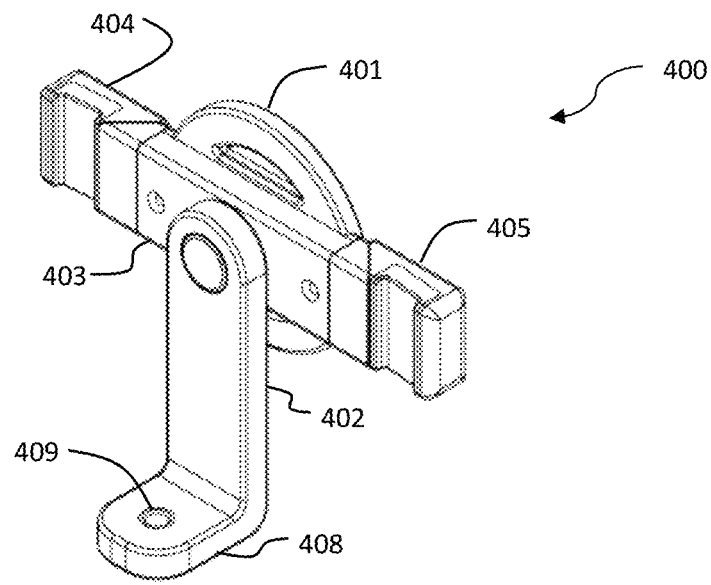
Figure 26B:
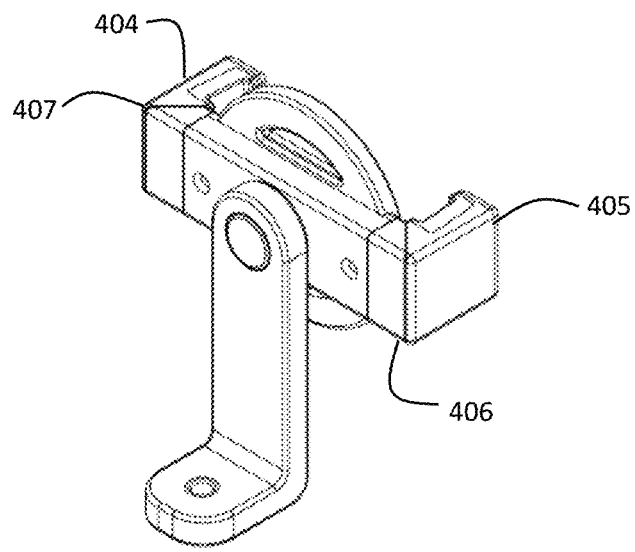
Figure 26C:
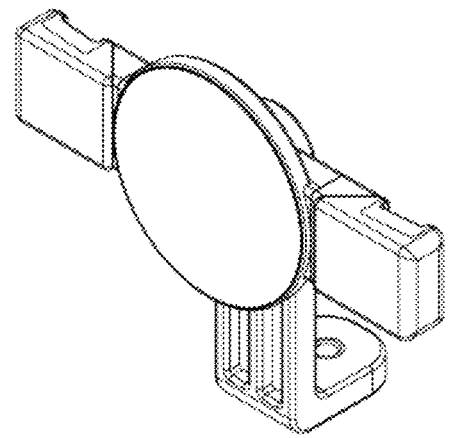
Figure 26D:
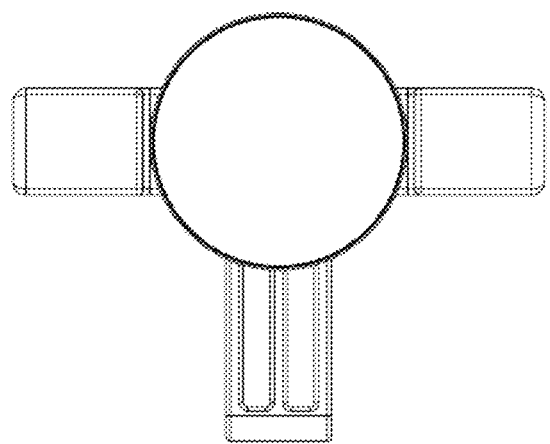
Figure 26E:
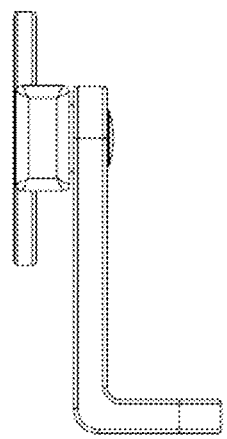
Figure 26F:
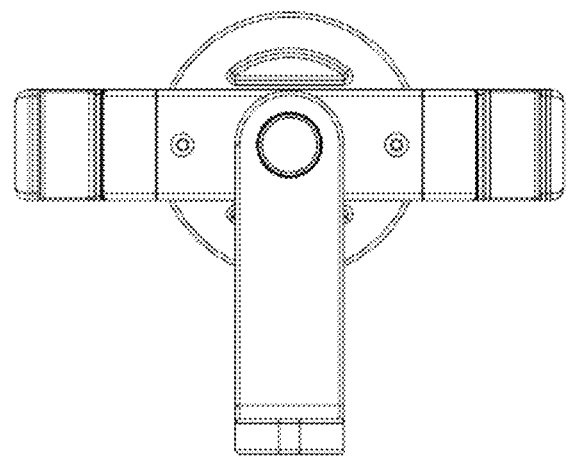

FIGS. 26C-26F illustrate the gripping arms 404, 405 in a flat configuration. FIGS. 26B and 28A-B illustrate the gripping arms 404, 405 in a gripping configuration. The gripping arms 404, 405 are adapted to rotate from a position in plane with the clip body 403 to a gripping position perpendicular to the clip body at a twist interface 406, 407. The twist interface may have detents such that the gripping arms can be set either in plane, or perpendicular, as shown comparatively in FIGS. 26A and 26B, for example. The gripping arms may be extendable outward, and resisted with springs within the clip body, allowing for gripping of devices of various dimension.

FIGS. 27A and 27B illustrate the gripping clip with magnetic connector 400 with a cellular telephone 110. The flat configuration allows for the coupling of the cellular telephone when no extra forces are placed upon the cellular telephone, for example. FIGS. 29A and 29B illustrate the gripping clip with magnetic connector 400 with a cellular telephone 110 in a gripping configuration. The gripping configuration allows for the coupling of the cellular telephone when extra forces may be placed upon the cellular telephone, for example, and provides the security of the gripping arms to maintain telephone retention.

In some embodiments of the present invention, as seen in FIGS. 30A-30AA, a second embodiment of a magnetic gripping clip for an electronic device 420 is adapted to magnetically couple to and support an electronic device, such as a cellular telephone. In some aspects, the magnetic gripping clip for an electronic device 420 couples to a cellular telephone with a magnetic or magnetically susceptible interface, which may be a circular interface. The magnetic gripping clip for an electronic device 420 may have a circular, or substantially circular, magnetic connection body 401. The circular magnetic connection body may be coupled to a clip body cross bracket 403 which may be rotatably coupled to the clip main post. The cross bracket may be centrally connected, at its center, to the main post 440. The clip body cross bracket has a first gripping arm 404 and a second gripping arm 405, which may be extendable relative to the clip body cross bracket 403. The gripping arms 404, 405 are adapted to rotate from a position in plane with the clip body 403 to a gripping position perpendicular to the clip body at a twist interface 406, 407. The twist interface may have detents such that the gripping arms can be set either in plane, or perpendicular. The gripping arms may be extendable outward, and resisted with springs within the clip body, allowing for gripping of devices of various dimension. A main post 440 has a first end and a second end. The first end of the main post is coupled to the clip body cross bracket 403. The second end the main post may have various threaded mounting inserts coupled to the main post. The mount 408 may have a threaded insert 428 on a bottom surface such that the mount 408 may be coupled to threaded post, such as seen on a tripod.

Figure 30B:
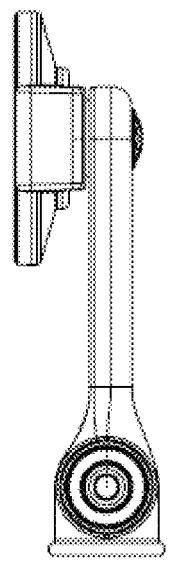
Figure 30C:
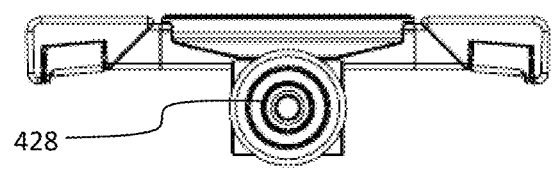
Figure 30D:
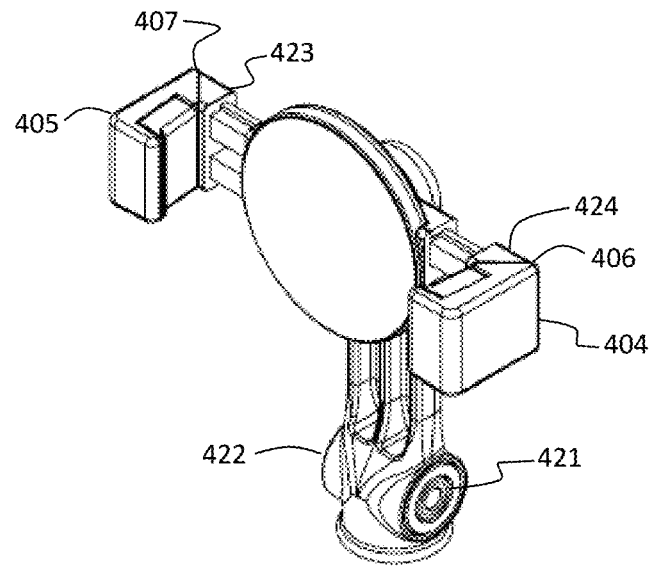
Figure 30E:
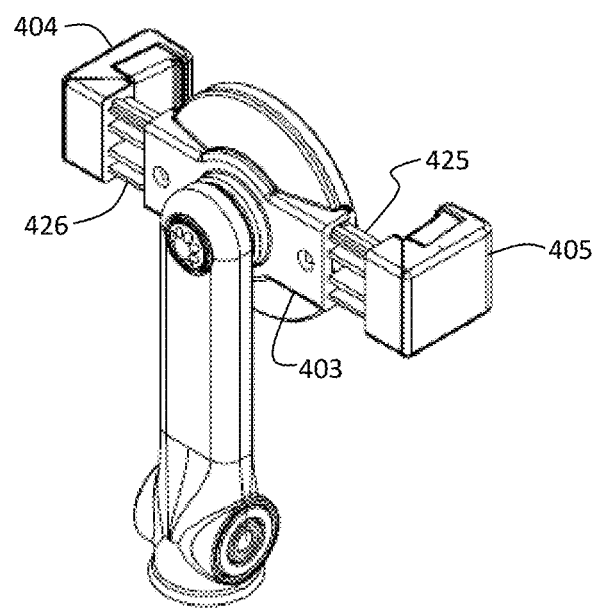
Figure 30F:
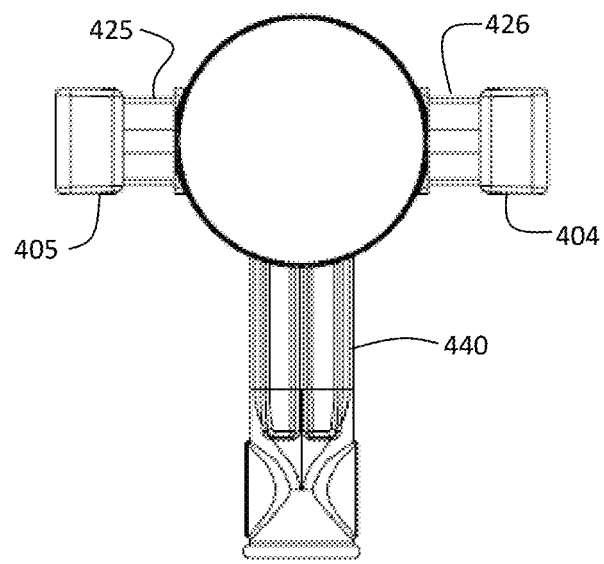
Figure 30G:
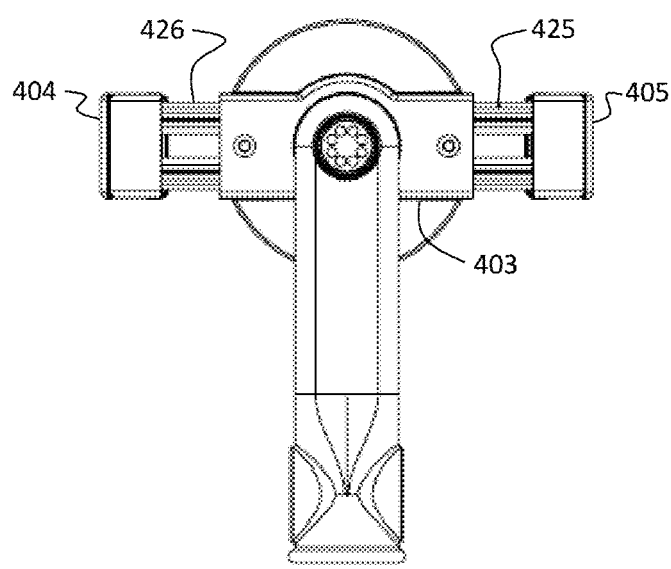
Figure 30H:
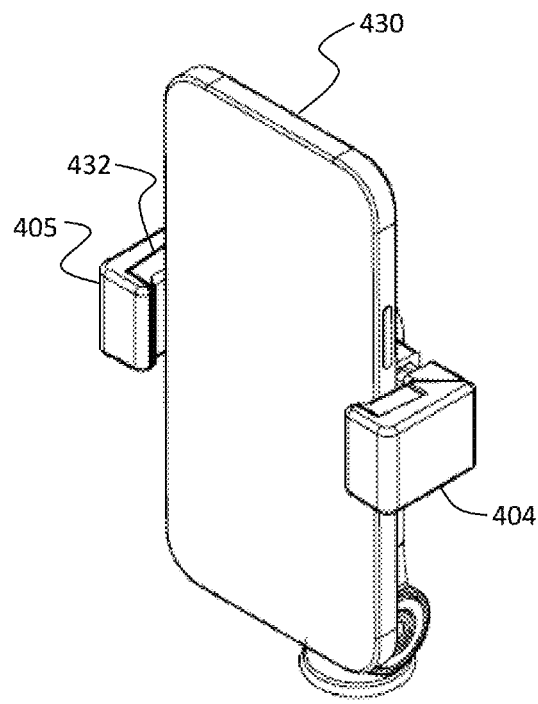
Figure 30I:
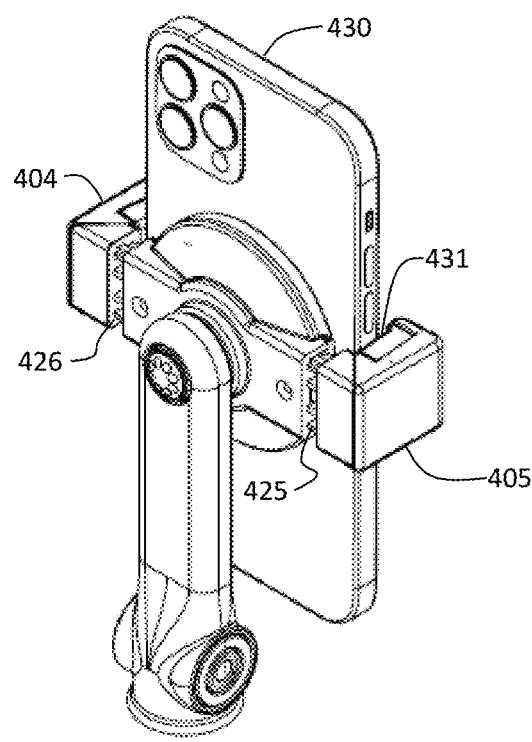
Figure 30J:
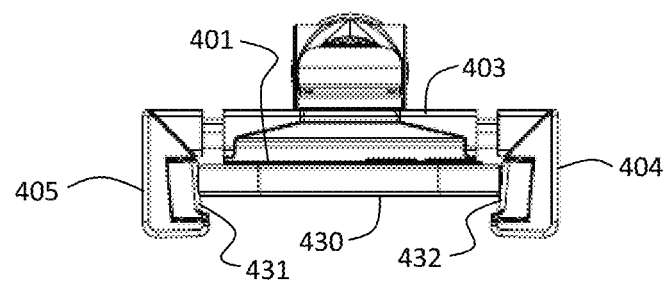

FIGS. 30A-C illustrate the magnetic gripping clip 420 in a first configuration wherein the first gripping arm 404 and the second gripping arm 404 are positioned to be parallel to the mounting surface of the magnetic connection body 401. The cross bracket 403 is perpendicular to the main post in this exemplary configuration. In such a configuration, a device such as a cellular telephone can magnetically couple to the magnet in the magnetic connection body. The extended gripping arms present a planar surface extension which may support the back surface of the cellular telephone. The planar surface extension reduces the torque which might be put onto the magnetic connection by limiting the amount of overhang of the telephone from the mounting surface. In contrast, FIGS. 30D-G illustrate the magnetic gripping clip 420 wherein the first gripping arm 404 and the second gripping arm 404 are positioned to be parallel to the mounting surface of the magnetic connection body 401. The first extension arm 424 and the first gripping arm 404 are seen extended from the cross bracket 403 on a first sliding section 425, and the second extension arm 423 and the second gripping arm 405 are seen extended from the cross bracket 403 on a second sliding section 426. In some aspects, the sliding sections 425, 426 resist extension with the use of one or more springs configures to resist the extension of the extension arms. FIGS. 30H-J further illustrate the magnetic gripping clip 420 which a cellular telephone mounted therein. In this exemplary configuration, the extension arms 423, 424 have been somewhat extended, showing a portion of the sliders 425, 426. The cellular telephone 430 is magnetically held in place on the mounting connection body 401, and then is further held by the gripping arms 404, 405, which are pulled in by the springs within the cross bracket 403. The gripping arms 404, 405 are adapted to rotate from a position in plane with the clip body 403 to a gripping position perpendicular to the clip body at a twist interface 406, 407. The twist interface may have detents such that the gripping arms can be set either in plane, or perpendicular, as shown comparatively in FIGS. 26A and 26B, for example. The gripping arms may be extendable outward, and resisted with springs within the clip body, allowing for gripping of devices of various dimension. The gripping arms 404, 405 are in a configuration perpendicular to the mounting surface of the mounting connection body. Resilient pads 431, 432 reset into the gripping arms 404, 405 help hold the cellular telephone firmly.

Figure 30K:
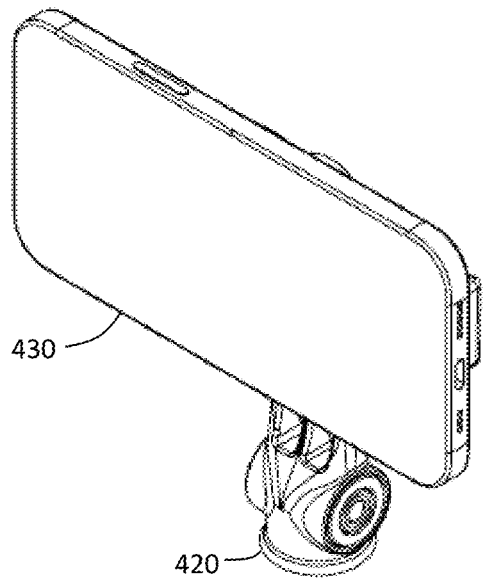
Figure 30L:
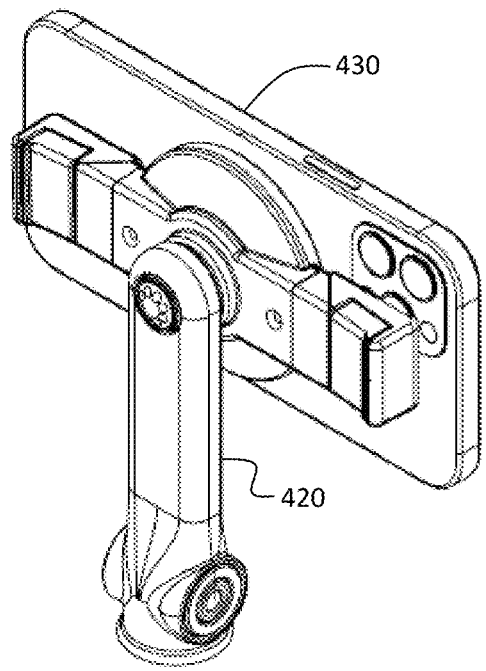
Figure 30M:
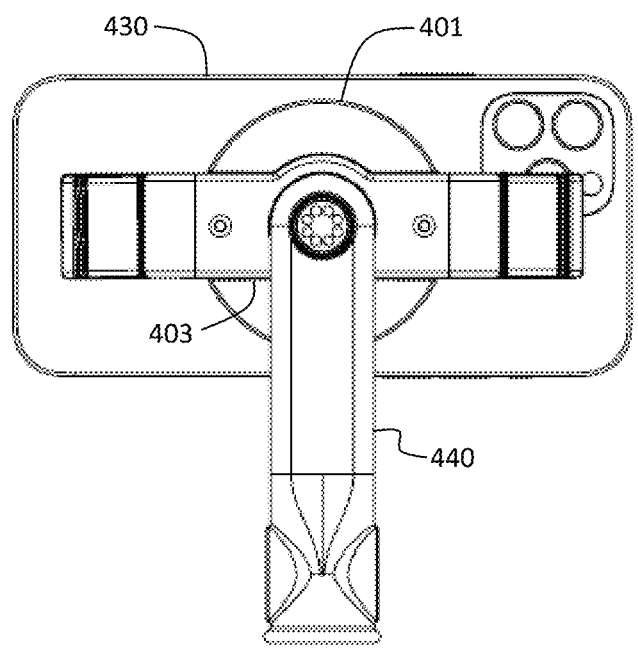

FIGS. 30K-M illustrate the magnetic gripping clip 420 in a configuration where the cross bracket 403 is perpendicular to the main post 440, and the gripping arms 404, 405 are configured to be parallel to the mounting surface of the mounting connection body. As can be seen, the extended surface provided by the gripping arms in this configuration enhances the stability of the mounting of the cellular telephone 430 to the magnetic gripping clip 440 despite not using the gripping aspect of the clip. The plane of the backside of the gripping arms is coplanar with the mounting surface of the mounting connection body.

Figure 30N:
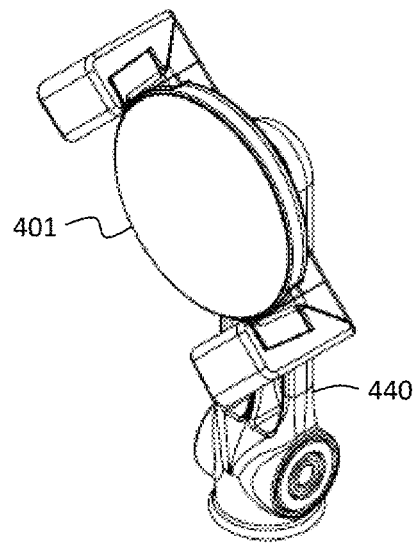
Figure 30O:
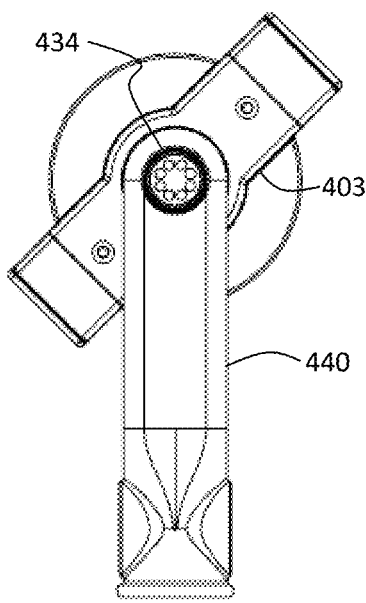

FIGS. 30N-O illustrate the magnetic gripping clip in an orientation wherein the cross bracket 403 is at an angle (45 degrees) to the main post 440 with the gripping arms in a configuration perpendicular to the magnetic mounting surface. A rotatable joint 434 between the cross bracket and the main post may be set with detents that allow for the cross bracket to be rotated when enough rotational force in applied, but then snaps into preset angular positions that then have sufficient detent for normal use.

Figure 30P:
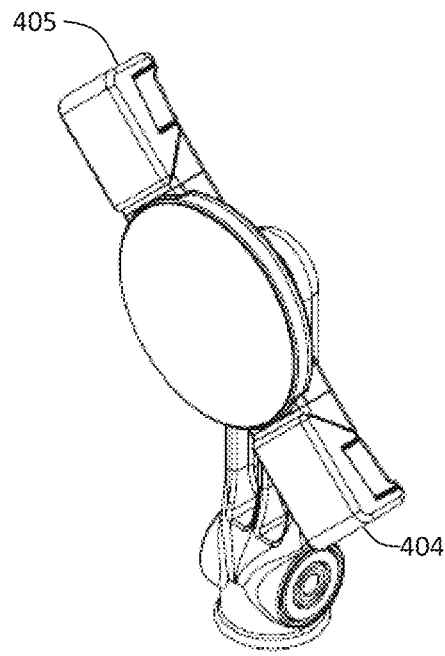
Figure 30Q:
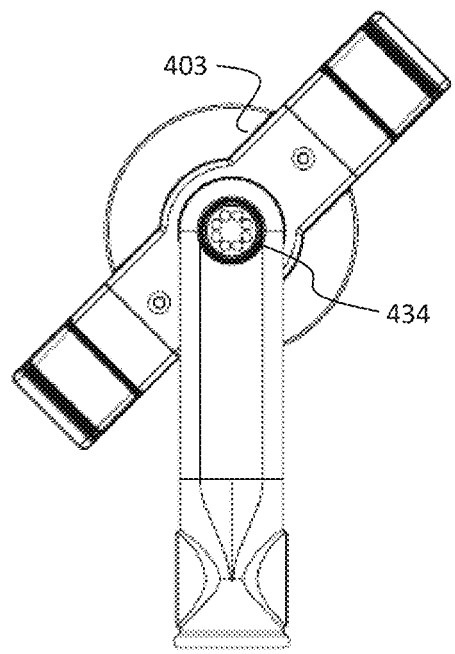
Figure 30R:
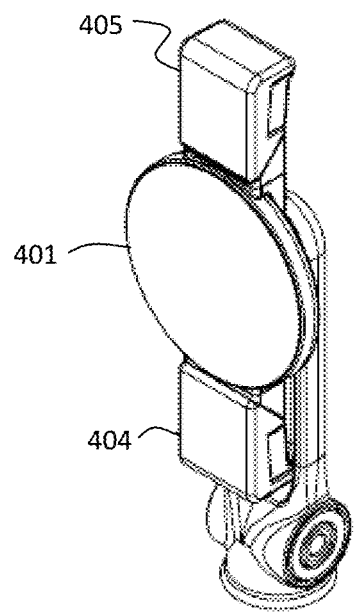
Figure 30S:
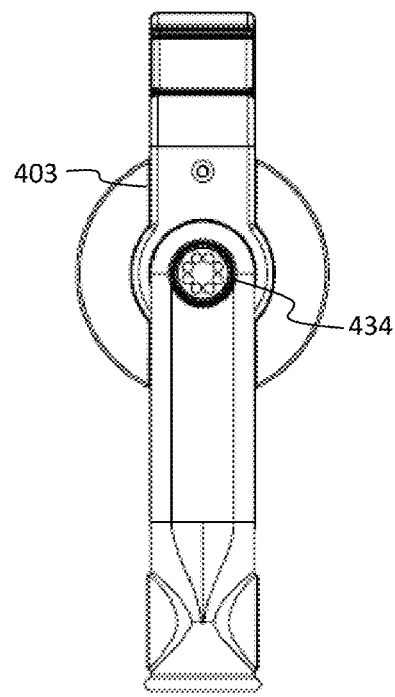
Figure 30T:
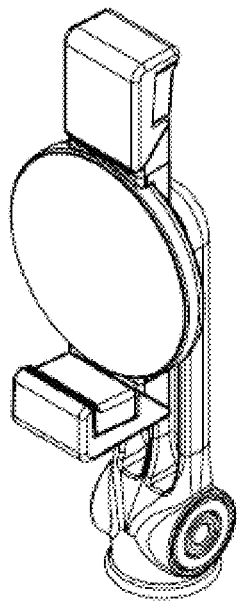
Figure 30U:
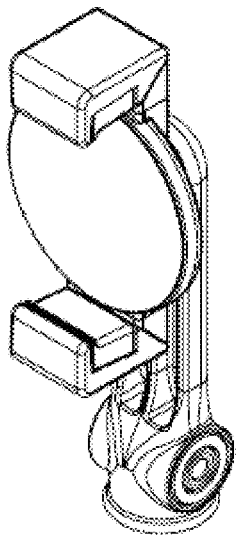
Figure 30V:
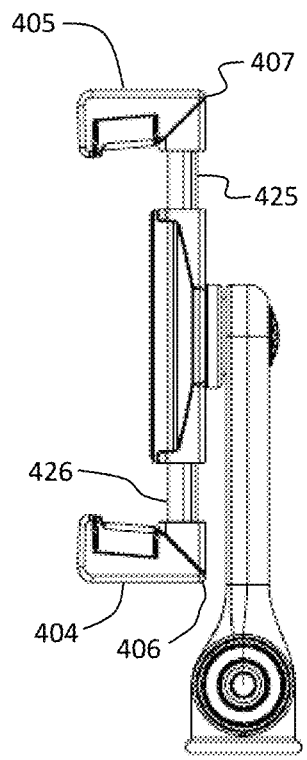

FIGS. 30P-Q illustrate the magnetic gripping clip in an orientation wherein the cross bracket 403 is at an angle (45 degrees) to the main post 440 with the gripping arms in a configuration parallel to the magnetic mounting surface. A rotatable joint 434 between the cross bracket and the main post may be set with detents that allow for the cross bracket to be rotated when enough rotational force in applied, but then snaps into preset angular positions that then have sufficient detent for normal use.

FIGS. 30R-V illustrate the magnetic gripping clip in an orientation wherein the cross bracket 403 is parallel to the main post 440 with the gripping arms in various configurations. A rotatable joint 434 between the cross bracket and the main post may be set with detents that allow for the cross bracket to be rotated when enough rotational force in applied, but then snaps into preset angular positions that then have sufficient detent for normal use.

Figure 30X:
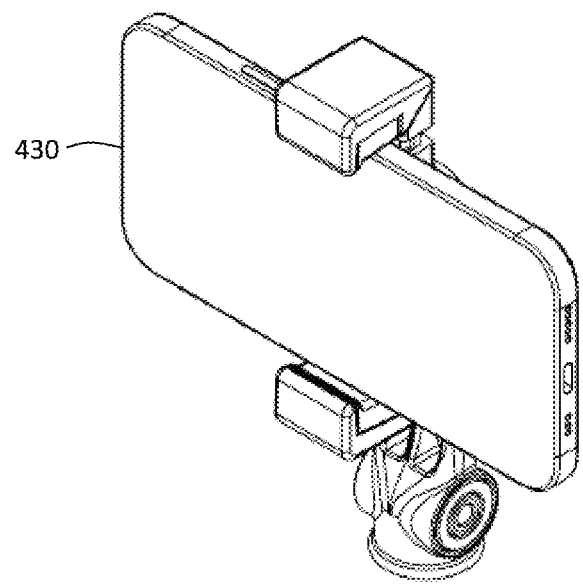
Figure 30Y:
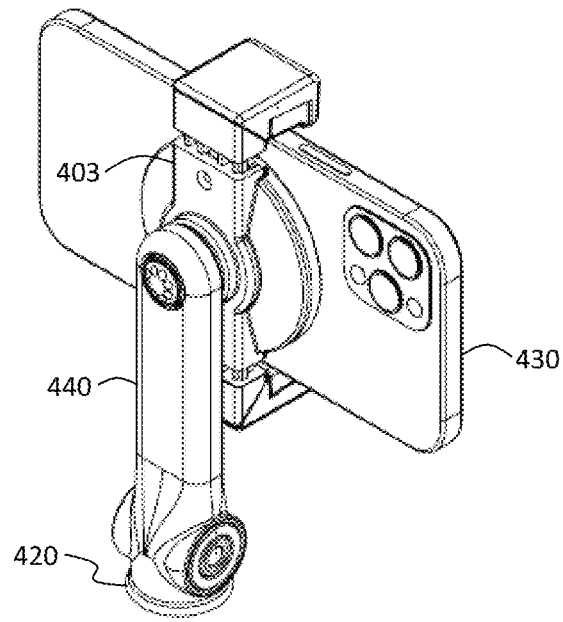
Figure 30Z:
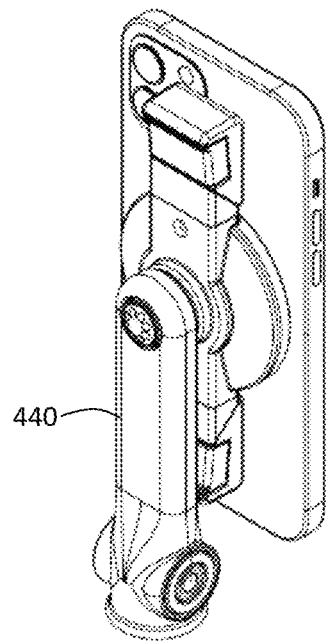
Figure 30A:
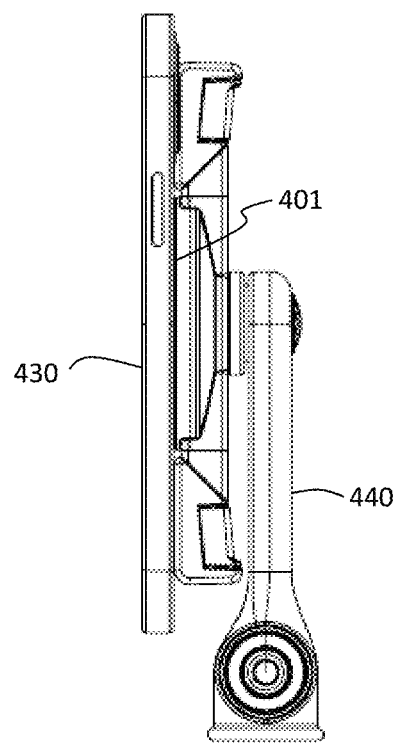

FIGS. 30X-Y illustrate the magnetic gripping clip 420 with a cellular telephone 430 mounted in a configuration wherein the cross bracket 403 is parallel to the main post 440 and the gripping arms are perpendicular to the magnetic mounting surface, and gripping the telephone. FIGS. 30Z-AA illustrate the magnetic gripping clip 420 with a cellular telephone 430 mounted in a configuration wherein the cross bracket 403 is parallel to the main post 440 and the gripping arms are parallel to the magnetic mounting surface, and providing further mounting surface support for the telephone.

In some embodiments of the present invention, as seen in FIGS. 46A-B, a magnetic gripping clip 420 supports a telephone 430. The magnetic gripping clip is mounted onto a tripod 441. In some aspects, the tripod 441 has a threaded post 442 which screws in the threaded mating insert on the bottom of the main post of the magnetic gripping clip 420. Flexible extensions 443 are fastened to threaded mating inserts along the side of the main post of the magnetic gripping clip and allow for further mounting of accessories, such as lights and other devices.

In some embodiments of the present invention, as seen in FIGS. 30A-30C, a platform vent clip with magnetic connector 460 is adapted to magnetically couple to an electronic device, such as a cellular telephone. In some aspects, the platform vent clip with magnetic connector 460 couples to a cellular telephone with a magnetic or magnetically susceptible interface, which may be a circular interface. The platform vent clip with magnetic connector 460 may have a circular, or substantially circular, magnetic connector 461 with a platform 462. The platform 462 may also have a magnetic key 463 for interfaces which include a keyed interface. The platform 462 may be coupled to a vent clip 464. The vent clip may have an internal recess 406 with a compressible pad 406. A tightening ring 467 may tighten the vent clip into place, and may be used in conjunction a ball joint. In an exemplary use, the platform vent clip with magnetic connector may be placed onto a fin of an auto vent, and a cellular telephone then placed upon the platform and magnetically coupled. FIGS. 31A and 31B illustrate a cellular telephone 110 on a vent clip with magnetic connector 460.

In some embodiments of the present invention, as seen in FIGS. 32A-32C, an auxiliary battery with magnetic connector 500 is adapted to magnetically couple to an electronic device, such as a cellular telephone. In some aspects, the auxiliary battery with magnetic connector 500 couples to a cellular telephone with a magnetic or magnetically susceptible interface, which may be a circular interface. The auxiliary battery with magnetic connector 500 may have a circular, or substantially circular, connection body 501. The circular body may contain a battery within it that is adapted to provide power to a mated device. A cord connector 503 and cable slot 504 may facilitate powered recharging of the auxiliary battery. FIGS. 33A and 33B illustrate the auxiliary battery with magnetic connector 500 coupled to a cellular telephone 110.

In some embodiments of the present invention, as seen in FIGS. 34A-34C, an auxiliary battery and receptacle 540 is adapted to magnetically couple to an electronic device, such as a cellular telephone. In some aspects, the auxiliary battery and receptacle 540 couples to a cellular telephone with a magnetic or magnetically susceptible interface, which may be a circular interface. The circular body may contain a battery within it that is adapted to provide power to a mated device. A recess 543 is adapted to receive a puck type charger as may be used with a cellular telephone. The puck may reside within the recess against a surface 544 and may be contained with a slight interference fit. A cord connector 544 and cable slot 555 may facilitate powered recharging of the auxiliary battery. The charging puck may have its cable plugged into the cord connector 544 to allow the use of the charging puck to route the battery power from the auxiliary battery and receptacle 540. The auxiliary battery and receptacle 540 with a charging puck in its recess may then be magnetically coupled to the cellular telephone.

In some embodiments of the present invention, as seen in FIGS. 36A and 36B, a clip support with magnetic connector is seen with a flip out cold shoe mount.

In embodiments of the present invention, device supports with a magnetic connector are adapted to magnetically couple to an electronic device, such as a cellular telephone. In some aspects, the device support couples to a cellular telephone with a magnetic or magnetically susceptible interface, which may be a circular interface. The device support may have a circular, or substantially circular, connection body coupled to a bracket support, or the circular magnetic interface may be embedded within a surface of the device support. The magnetic coupler may present a flat surface such that the surface is adapted to couple to a magnetic coupling area of a cellular telephone.

FIG. 44 illustrates a cross-section of a magnetic coupling body as seen in embodiments of the present invention. A front cover 245 provides the mating surface to the device, such as a cellular telephone. A circular magnet 243 resides within the coupling body 244. In some aspects, the circular magnet 243 may have an exterior diameter of 54 mm and an interior diameter of 46 mm, and may be 2.25 mm thick. The circular magnet 243 allows for coupling of the cellular telephone to the clip support, or other accessory as described herein, to a mating magnetic, or magnetically susceptible, interface which also may circular in nature. The circular nature of the interface allows for held positional fit of the clip support to the cellular telephone, and may draw the clip support into this concentric fit if attached close to concentrically initially.

In some embodiments of the present invention, as seen in FIGS. 38A-38C, a device support with magnetic connector, folding stand, and rotating mount 600 is adapted to magnetically couple to an electronic device, such as a cellular telephone. In some aspects, the device support 600 couples to a cellular telephone with a magnetic or magnetically susceptible interface, which may be a circular interface. The clip support 600 may have a circular, or substantially circular, connection body 603 rotatably coupled to a first bracket support 602. The first bracket support 602 is pivotally coupled to a second bracket support 601. The first bracket support 602 and the second bracket support 601 may be joined at pivot adapted to allow for placing into different angular configurations while having sufficient holding force to retain the position once placed. The bottom surface of the second bracket support 601 may be a flat surface adapted to reside on a support, such as a tripod head, and may be fastened to a threaded post of a tripod or other support using the threaded insert 607. The magnetic coupler 603 may present a flat surface such that the surface is adapted to couple to a magnetic coupling area of a cellular telephone. The pivoting of the rotatable connection body 603 allows the magnetic interface to face either direction. Side rails 604 on the second bracket support 601 may be extendable to act as an outrigger for enhanced stability.

In some embodiments of the present invention, as seen in FIG. 39A, a device support with magnetic connector, folding stand, and rotating mount 620 is adapted to magnetically couple to an electronic device, such as a cellular telephone. In some aspects, the device support 620 couples to a cellular telephone with a magnetic or magnetically susceptible interface, which may be a circular interface. The clip support 620 may have a first bracket support 625 rotatably and pivotally coupled to a second bracket support 621. The first bracket support 625 is rotatably coupled at a pivot joint to a second bracket support 621. The first bracket support 625 and the second bracket support 621 may be joined at pivot adapted to allow for placing into different angular configurations while having sufficient holding force to retain the position once placed. The bottom surface of the second bracket support may be a flat surface adapted to reside on a support, such as a tripod head, and may be fastened to a threaded post of a tripod or other support using the threaded insert 622. The magnetic coupler 626 may present a flat surface such that the surface is adapted to couple to a magnetic coupling area of a cellular telephone. The second bracket support 621 may spread out at a sliding coupler 628 such that a first portion 621*a* and a second portion 621*b* configure for enhanced stability.

In some embodiments of the present invention, as seen in FIG. 39B, a device support with magnetic connector, folding stand, and rotating mount 640 is adapted to magnetically couple to an electronic device, such as a cellular telephone. In some aspects, the device support 640 couples to a cellular telephone with a magnetic or magnetically susceptible interface, which may be a circular interface. The clip support 640 may have a first bracket support 645 spherically coupled to a second bracket support 641. The first bracket support 645 and the second bracket support 641 may be adapted to allow for placing into different angular configurations while having sufficient holding force to retain the position once placed. The bottom surface of the second bracket support may be a flat surface adapted to reside on a support, such as a tripod head, and may be fastened to a threaded post of a tripod or other support using the threaded insert 642. The magnetic coupler 646 may present a flat surface such that the surface is adapted to couple to a magnetic coupling area of a cellular telephone. The second bracket support 641 may spread out at a sliding coupler such that a first portion 641*a* and a second portion 641*b* configure for enhanced stability. The second bracket support may have interfaces 647 adapted to fit into tripod mounting clips.

In some embodiments of the present invention, as seen in FIG. 39C, a device support with magnetic connector and rotating mount 660 is adapted to magnetically couple to an electronic device, such as a cellular telephone. In some aspects, the device support 660 couples to a cellular telephone with a magnetic or magnetically susceptible interface, which may be a circular interface. The clip support 660 may have a first bracket support 665 spherically coupled to a second bracket support 661. The first bracket support 665 and the second bracket support 661 may be adapted to allow for placing into different angular configurations while having sufficient holding force to retain the position once placed. The first bracket 665 may have a mirror 666 on a side opposite of the magnetic interface. The bottom surface of the second bracket support may be a flat surface adapted to reside on a support, such as a tripod head, and may be fastened to a threaded post of a tripod or other support using the threaded insert 662. The magnetic coupler 646 may present a flat surface such that the surface is adapted to couple to a magnetic coupling area of a cellular telephone. The second bracket support 661 may spread out at a sliding coupler such that a first portion 661*a* and a second portion 661*b* configure for enhanced stability. The second bracket support may have interfaces 667 adapted to fit into tripod mounting clips.

FIG. 40 illustrates another embodiment 680 of a device support with magnetic connector and rotating mount. The device support 680 represents another variation of a folding base with spreadable portions, wherein the upper bracket may both pivot and rotate relative to the lower bracket.

In some embodiments of the present invention, as seen in FIGS. 41A-E, a device support with magnetic connector 700 is adapted to magnetically couple to an electronic device, such as a cellular telephone. In some aspects, the device support 700 couples to a cellular telephone with a magnetic or magnetically susceptible interface, which may be a circular interface. The circular magnetic interface may be embedded within a band 704. The device support 700 may have a first bracket support 701 pivotally coupled to a second bracket support 702. The first bracket support 701 and the second bracket support 702 may be adapted to allow for placing into different angular configurations while having sufficient holding force to retain the position once placed. The bottom surface of the second bracket support may be a flat surface adapted to reside on a support, such as a tripod head, and may be fastened to a threaded post of a tripod or other support using the threaded insert 705. The magnetic coupler 704 may present a flat surface such that the surface is adapted to couple to a magnetic coupling area of a cellular telephone. FIGS. 4D and 4E illustrate a cellular telephone 710 coupled to the device support 700.

In some embodiments of the present invention, as seen in FIGS. 42A-B, a device support with magnetic connector and charger 740 is adapted to magnetically couple to an electronic device, such as a cellular telephone. In some aspects, the device support 700 couples to a cellular telephone with a magnetic or magnetically susceptible interface, which may be a circular interface 751. The circular magnetic interface may include a charging aspect adapted to charge a supported device, such as a cellular telephone. The device support 740 may have a first bracket support 741 pivotally coupled to a second bracket support 742 at a pivot 743. The first bracket support 741 and the second bracket support 742 may be adapted to allow for placing into different angular configurations while having sufficient holding force to retain the position once placed. The bottom surface of the second bracket support may be a flat surface adapted to reside on a support, such as a tripod head, and may be fastened to a threaded post of a tripod or other support using the threaded insert 745. The magnetic coupler 740 may present a flat surface such that the surface is adapted to couple to a magnetic coupling area of a cellular telephone.

In some embodiments of the present invention, as seen in FIGS. 43A-C, a charger support 760 is adapted to magnetically couple to an electronic device, such as a cellular telephone. In some aspects, the charger support 760 couples to a charging disc which contains a circular interface adapted to couple to a cellular telephone. In this way the charger support 760 may support the cellular telephone through the intermediate coupling of the charger support 760. The device support 760 may have a first bracket support 760 with a recesses 764 within protruding bracket arms 763. The first bracket support 760 is coupled to a second bracket support portion 762. The second bracket support portion may act as a stand alone support or may be coupled to a tripod or other device. A magnetic coupling charging disc 765 may reside within the recesses 764. The charging disc may include an external power cord 766 which may route through a slot 767 within the bracket.

In some embodiments of the present invention, as seen in FIGS. 45A-C a support with magnetic connector 800 is adapted to magnetically couple to an electronic device, such as a cellular telephone. In some aspects, the support 800 couples to a cellular telephone with a magnetic or magnetically susceptible interface, which may be a circular interface. The support 800 may have a circular, or substantially circular, connection body which presents a flat surface 802 such that the surface is adapted to couple to a magnetic coupling area of a cellular telephone. An adhesive surface 803 allows for attachment of the support 260 to a surface. The adhesive mounting surface 803 may be parallel to the flat surface 802 for mounting to a cellular telephone. A plurality of slots 801 within the central portion 804 of the connection body are adapted to allow for routing, and fastening, of a power cord which may be coupled to the supported device. The power cord may be routed through a hollow central section which is accessed through the slots 801. When the device is removed from the support, the cord may thusly remain with the support 800. A front cover provides the mating surface to the device, such as a cellular telephone. In some aspects, the front cover may be of a frictional or resilient material to add to the security of the attachment. A circular magnet resides within the connection body. In some aspects, the circular magnet may have an exterior diameter of 54 mm and an interior diameter of 46 mm, and may be 2.25 mm thick. The circular magnet allows for coupling of the cellular telephone to the clip support, or other accessory as described herein, to a mating magnetic, or magnetically susceptible, interface which also may circular in nature. The circular nature of the interface allows for held positional fit of the clip support to the cellular telephone, and may draw the clip support into this concentric fit if attached close to concentrically initially.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

The invention claimed is:

1. A deployable light with magnetic connector for an electronic device, said deployable light with magnetic connector comprising:
   a connection body, said connection body portion comprising:
      a flat mounting surface on a first side; and
      a magnet within said connection body configured to magnetically attach along said flat mounting surface;
   a first extension portion rigidly coupled to said connection body;
   a lighting element, said lighting element comprising a planar lighting element configured to disperse light in a first direction; and
   a second extension portion rigidly coupled to said lighting element, wherein said first extension portion is pivotally coupled to said second extension portion and wherein said second extension portion is adapted to pivot from a first position in a stowed configuration directly adjacent to said connection body to a second position in a deployed configuration 180 degrees opposed to said first position, and wherein said planar circular lighting element is configured to disperse light in a direction perpendicular to and away from said flat mounting surface in said second position.

2. The deployable light with magnetic connector of claim 1 where said magnet is an annular magnet under an outer area of said flat mounting surface.

3. The deployable light with magnetic connector of claim 2 where said magnet is an annular magnet under an outer area of said flat mounting surface.

4. The deployable light with magnetic connector of claim 3 wherein said light is a circular light, and wherein said lighting element is adapted to pivot from a stowed position adjacent to said connection body to a second deployed position 180 degrees opposed to said first position.

5. The deployable light with magnetic connector of claim 4 wherein said lighting element is a circular annular light, and wherein said light resides around said connection body when in said stowed position.

6. The deployable light with magnetic connector of claim 1 further comprising a battery electrically coupled to said lighting element.

7. The deployable light with magnetic connector of claim 1 further comprising a battery electrically coupled to said lighting element.

8. The deployable light with magnetic connector of claim 5 further comprising a battery electrically coupled to said lighting element.

9. A deployable light for use with a cellular telephone, said deployable light comprising:
   a connection body, said connection body portion comprising a flat mounting surface on a first side, said flat mounting surface adapted to mount to the cellular telephone;
   a lighting element, said lighting element pivotally coupled to said connection body, wherein said lighting element is adapted to deploy from a stowed position wherein said lighting element shines light in a direction opposite the direction which the flat mounting surface faces, to a deployed position wherein said lighting element shines a light in the direction which the flat mounting surface faces;
   a first extension portion coupled to said connection body; and
   a second extension portion coupled to said lighting element, wherein said first extension portion is pivotally coupled to said second extension portion, thereby coupling said connection body to said lighting element.

10. The deployable light of claim 9 wherein said connection body further comprises a magnet within said connection body.

11. The deployable light of claim 10 where said magnet is an annular magnet under an outer area of said flat mounting surface.

12. The deployable light of claim 9 wherein said light is a circular light, and wherein said light is adapted to pivot from a stowed configuration adjacent to said connection body to a deployed configuration 180 degrees opposed to said stowed configuration.

13. The deployable light of claim 10 wherein said light is a circular light, and wherein said light is adapted to pivot from a stowed configuration adjacent to said connection body to a deployed configuration 180 degrees opposed to said stowed configuration.

14. The deployable light of claim 11 wherein said light is a circular light, and wherein said light is adapted to pivot from a stowed configuration adjacent to said connection body to a deployed configuration 180 degrees opposed to said stowed configuration.

\* \* \* \* \*